US012603405B2

(12) United States Patent
Kageyama

(10) Patent No.: US 12,603,405 B2
(45) Date of Patent: Apr. 14, 2026

(54) SECONDARY BATTERY

(71) Applicant: MURATA MANUFACTURING CO., LTD., Kyoto (JP)

(72) Inventor: Masayuki Kageyama, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 527 days.

(21) Appl. No.: 18/121,202

(22) Filed: Mar. 14, 2023

(65) Prior Publication Data

US 2023/0223668 A1 Jul. 13, 2023

Related U.S. Application Data

(63) Continuation of application No. PCT/JP2021/027131, filed on Jul. 20, 2021.

(30) Foreign Application Priority Data

Sep. 17, 2020 (JP) ................................ 2020-156541

(51) Int. Cl.

*H01M 50/586* (2021.01)
*H01M 10/0525* (2010.01)
*H01M 10/0587* (2010.01)
*H01M 10/658* (2014.01)

(Continued)

(52) U.S. Cl.

CPC ..... *H01M 50/586* (2021.01); *H01M 10/0525* (2013.01); *H01M 10/0587* (2013.01);

(Continued)

(58) Field of Classification Search

CPC ........... H01M 10/658; H01M 10/0587; H01M 50/109; H01M 50/167; H01M 50/169;

(Continued)

(56) References Cited

U.S. PATENT DOCUMENTS

2008/0233474 A1 9/2008 Son et al.
2011/0076533 A1 3/2011 Choi (Continued)

FOREIGN PATENT DOCUMENTS

CN 210379123 U 4/2020
CN 111416068 A 7/2020

(Continued)

OTHER PUBLICATIONS

JP2014127242 English translation. Nagaoka et al. Japan. Jul. 7, 2014. (Year: 2014).*

(Continued)

*Primary Examiner* — Christopher P Domone
(74) *Attorney, Agent, or Firm* — K&L Gates LLP

(57) ABSTRACT

A secondary battery includes an outer package member, a battery device, and a heat-resistant member. The battery device is contained inside the outer package member. The heat-resistant member has an insulating property and is disposed between the outer package member and the battery device. The outer package member includes a container member and a closing member. The container member has an opening, and contains the battery device inside. The closing member closes the opening, and is welded to the container member. The battery device has an opposed surface and a side surface. The opposed surface is opposed to the closing member. The side surface is coupled to the opposed surface. The heat-resistant member covers from the opposed surface to the side surface.

11 Claims, 7 Drawing Sheets

(51) Int. Cl.
*H01M 50/109* (2021.01)
*H01M 50/169* (2021.01)
*H01M 50/595* (2021.01)

(52) U.S. Cl.
CPC ....... *H01M 10/658* (2015.04); *H01M 50/109* (2021.01); *H01M 50/169* (2021.01); *H01M 50/595* (2021.01); *H01M 2200/00* (2013.01)

(58) Field of Classification Search
CPC ............. H01M 50/171; H01M 50/593; H01M 50/595; H01M 50/0587; H01M 50/0422; H01M 50/643
See application file for complete search history.

(56) References Cited

U.S. PATENT DOCUMENTS

| | | | | |
|---|---|---|---|---|
| 2020/0144675 | A1* | 5/2020 | Terashima | H01M 10/0587 |
| 2021/0408626 | A1* | 12/2021 | Ko | H01M 50/559 |

FOREIGN PATENT DOCUMENTS

| | | | |
|---|---|---|---|
| JP | H01239769 | A | 9/1989 |
| JP | 2010003471 | A | 1/2010 |
| JP | 2012195122 | A | 10/2012 |
| JP | 2013246878 | A | 12/2013 |
| JP | 2014127242 | A | 7/2014 |
| JP | 2015153690 | A | 8/2015 |
| JP | 2019110036 | A | 7/2019 |

OTHER PUBLICATIONS

Japanese Office Action issued Mar. 26, 2024 in corresponding Japanese Application No. 2022-550386.

International Search Report of corresponding PCT application PCT/JP2021/027131, dated Oct. 12, 2021.

* cited by examiner

SECONDARY BATTERY

CROSS REFERENCE TO RELATED APPLICATIONS

The present application is a continuation of PCT patent application no. PCT/JP2021/027131, filed on Jul. 20, 2021, which claims priority to Japanese patent application no. JP2020-156541, filed on Sep. 17, 2020, the entire contents of which are incorporated herein by reference.

BACKGROUND

The present technology relates to a secondary battery.

Various kinds of electronic equipment, including mobile phones, have been widely used. Such widespread use has promoted development of a secondary battery as a power source that is smaller in size and lighter in weight and allows for a higher energy density. The secondary battery includes a battery device contained inside an outer package member, and the battery device includes a positive electrode, a negative electrode, and an electrolyte. A configuration of the secondary battery has been considered in various ways in order to achieve various purposes.

For example, in order to suppress damage to a separator due to heat generated at the time of welding of a main body member and a cover member of a case, the cover member and the main body member are welded to each other along a level difference formed on the cover member, and the cover member and the main body member form a groove.

In order to suppress a short circuit between a positive electrode and a negative electrode in a high temperature environment, the positive electrode and the negative electrode are each covered with use of an insulating tape having a melting point higher than a shutdown temperature of a separator.

In order to prevent occurrence of an internal short circuit due to erroneous use, in a spiral electrode body in which a band-shaped positive electrode and a band-shaped negative electrode are wound with a separator interposed therebetween, a peripheral surface of the spiral electrode body is entirely covered by an insulating film.

In order to suppress a decrease in insulating property between electrode plates, an electrode body is disposed inside a battery case with a cover body welded thereto, with an insulating film interposed between the battery case and the electrode body, and the insulating film is wound around a periphery of the electrode body by one or more winds.

SUMMARY

The present technology relates to a secondary battery.

Although consideration has been given in various ways regarding a configuration of a secondary battery, achievement of both a battery characteristic (improvement of a battery capacity) and safety (suppression of occurrence of a short circuit) still remains insufficient. Accordingly, there is still room for improvement in terms thereof.

It is therefore desirable to provide a secondary battery that is able to suppress occurrence of a short circuit while securing a battery capacity according to an embodiment.

A secondary battery according to an embodiment of the present technology includes an outer package member, a battery device, and a heat-resistant member. The battery device is contained inside the outer package member. The heat-resistant member has an insulating property and is disposed between the outer package member and the battery device. The outer package member includes a container member and a closing member. The container member has an opening, and contains the battery device inside. The closing member closes the opening, and is welded to the container member. The battery device has an opposed surface and a side surface. The opposed surface is opposed to the closing member. The side surface is coupled to the opposed surface. The heat-resistant member covers from the opposed surface to the side surface.

According to the secondary battery of an embodiment of the present technology, the battery device having the opposed surface and the side surface is contained inside the outer package member including the container member and the closing member, the closing member is welded to the container member, the heat-resistant member is disposed between the outer package member and the battery device, and the heat-resistant member covers from the opposed surface to the side surface. This makes it possible to suppress occurrence of a short circuit while securing a battery capacity.

Note that effects of the present technology are not necessarily limited to those described herein and may include any of a series of suitable effects described in relation to the present technology.

DETAILED DESCRIPTION

One or more embodiments of the present technology are described below in further detail including with reference to the drawings.

A description is given of a secondary battery according to an embodiment of the present technology.

The secondary battery to be described here is a secondary battery that has a flat and columnar three-dimensional shape, and is commonly referred to by a term such as a coin type or a button type. As will be described later, the secondary battery includes two bottom parts opposed to each other, and a sidewall part lying between the two bottom parts. This secondary battery has a height smaller than an outer diameter. The "outer diameter" is a diameter (a maximum diameter) of each of the two bottom parts. The "height" is a distance (a maximum distance) from one of the bottom parts to another of the bottom parts.

Although a charge and discharge principle of the secondary battery is not particularly limited, the following description deals with a case where a battery capacity is obtained using insertion and extraction of an electrode reactant. The secondary battery includes a positive electrode, a negative electrode, and an electrolyte. In the secondary battery, to suppress precipitation of the electrode reactant on a surface of the negative electrode during charging, a charge capacity of the negative electrode is greater than a discharge capacity of the positive electrode. In other words, an electrochemical capacity per unit area of the negative electrode is set to be greater than an electrochemical capacity per unit area of the positive electrode.

Although not particularly limited in kind, the electrode reactant is specifically a light metal such as an alkali metal or an alkaline earth metal. Examples of the alkali metal include lithium, sodium, and potassium. Examples of the alkaline earth metal include beryllium, magnesium, and calcium.

Examples are given below of a case where the electrode reactant is lithium. A secondary battery that obtains the battery capacity using insertion and extraction of lithium is a so-called lithium-ion secondary battery. In the lithium-ion secondary battery, lithium is inserted and extracted in an ionic state.

Figure 1:
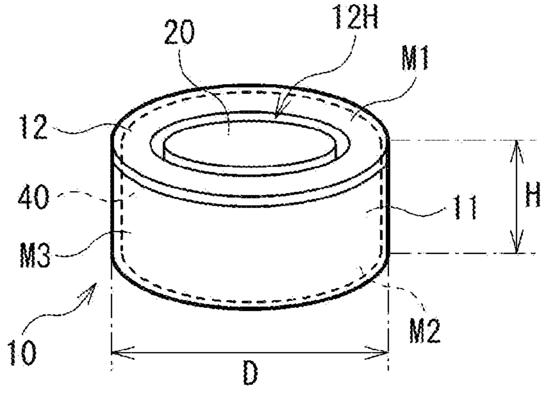
FIG. 1 is a perspective view of a configuration of a secondary battery according to an embodiment of the present technology.
Figure 2:
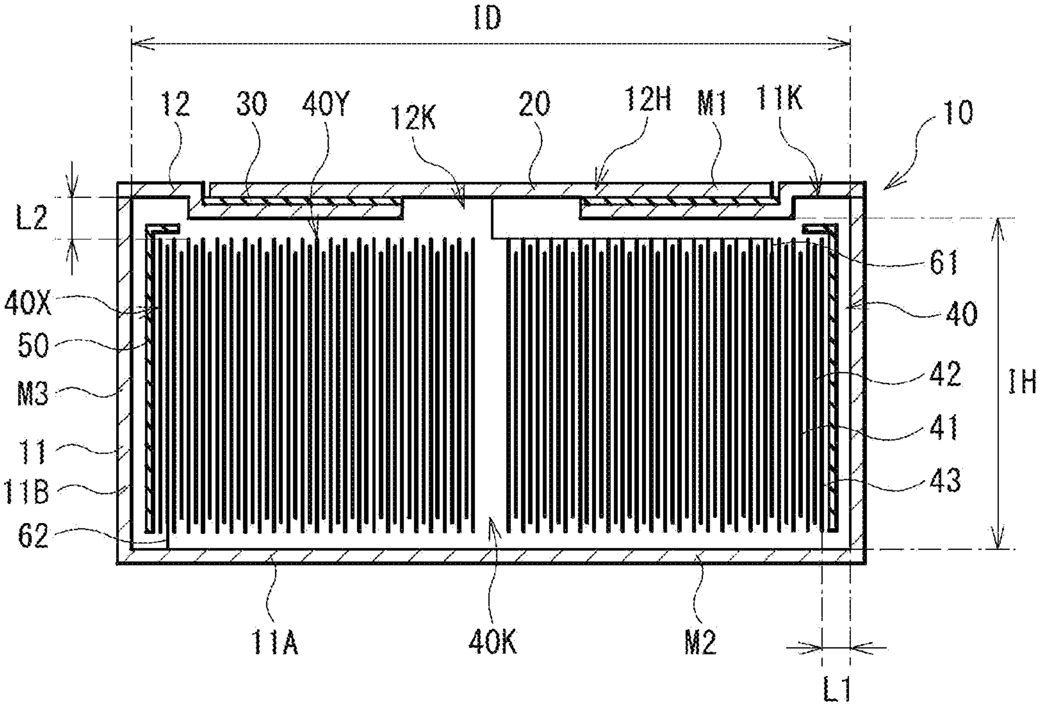
FIG. 2 is a sectional view of the configuration of the secondary battery illustrated in FIG. 1.
Figure 3:
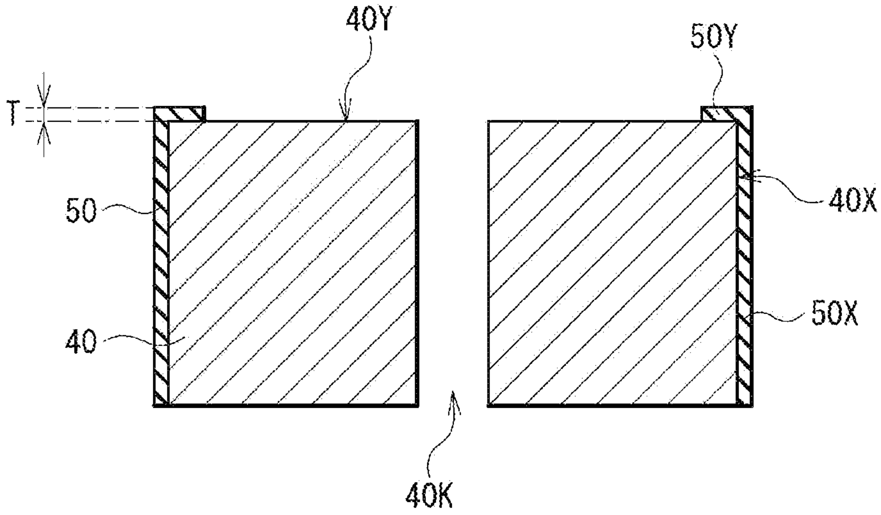
FIG. 3 is a schematic sectional view of a configuration of a main part of the secondary battery illustrated in FIG. 2.
Figure 4:
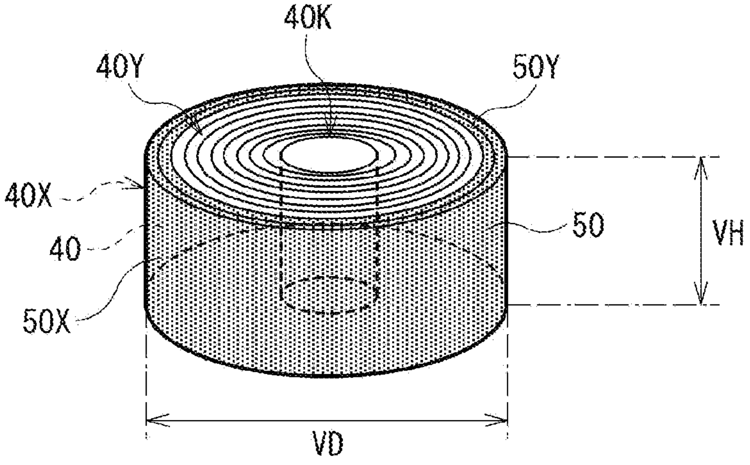
FIG. 4 is a perspective view of the configuration of the main part of the secondary battery illustrated in FIG. 2.
Figure 5:
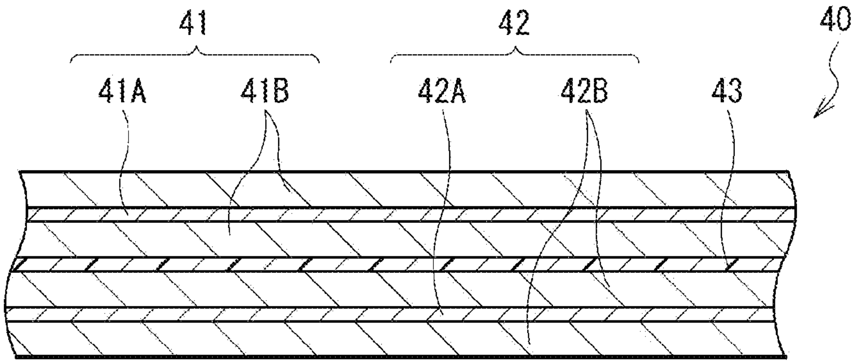
FIG. 5 is a sectional view of a configuration of a battery device illustrated in FIG. 2.

FIG. 1 illustrates a perspective configuration of the secondary battery. FIG. 2 illustrates a sectional configuration of the secondary battery illustrated in FIG. 1. FIG. 3 schematically illustrates a sectional configuration of a main part of the secondary battery illustrated in FIG. 2. FIG. 4 illustrates a perspective configuration of the main part of the secondary battery illustrated in FIG. 2. FIG. 5 illustrates a sectional configuration of a battery device 40 illustrated in FIG. 2.

Note that in FIG. 2, for simplifying the illustration, a positive electrode 41, a negative electrode 42, a separator 43, a positive electrode lead 61, and a negative electrode lead 62 are each illustrated in a linear shape. For easy viewing of a positional relationship between the battery device 40 and a heat-resistant tape 50, FIG. 2 illustrates a state in which the heat-resistant tape 50 is separated from the battery device 40. FIGS. 3 and 4 each illustrate only the battery device 40 and the heat-resistant tape 50, and the sectional configuration of the battery device 40 is simplified in FIG. 3. FIG. 5 illustrates only a portion of the sectional configuration of the battery device 40.

For convenience, the following description is given with an upper side of each of FIGS. 1 and 2 assumed as an upper side of the secondary battery, and a lower side of each of FIGS. 1 and 2 assumed as a lower side of the secondary battery.

The secondary battery to be described here has such a three-dimensional shape that a height H is smaller than an outer diameter D, as illustrated in FIG. 1. In other words, the secondary battery has a flat and columnar three-dimensional shape. Here, the three-dimensional shape of the secondary battery is flat and cylindrical (circular columnar).

Dimensions of the secondary battery are not particularly limited. However, for example, the outer diameter D is within a range from 3 mm to 30 mm both inclusive, and the height H is within a range from 0.5 mm to 70 mm both inclusive. Note that a ratio of the outer diameter D to the height H, i.e., D/H, is greater than 1. Although not particularly limited, an upper limit of the ratio D/H is specifically less than or equal to 25.

As illustrated in FIGS. 1 to 5, the secondary battery includes an outer package can 10, the battery device 40, and the heat-resistant tape 50. Here, the secondary battery further includes an external terminal 20, a gasket 30, the positive electrode lead 61, and the negative electrode lead 62.

As illustrated in FIGS. 1 and 2, the outer package can 10 is a hollow outer package member to contain the battery device 40 and other components therein.

Here, the outer package can 10 has a flat and cylindrical three-dimensional shape corresponding to the three-dimensional shape of the secondary battery which is flat and cylindrical. Accordingly, the outer package can 10 includes an upper bottom part M1 and a lower bottom part M2 opposed to each other, and a sidewall part M3 lying between the upper bottom part M1 and the lower bottom part M2. The sidewall part M3 has an upper end part coupled to the upper bottom part M1, and a lower end part coupled to the lower bottom part M2. As described above, the outer package can 10 is cylindrical. Thus, the upper bottom part M1 and the lower bottom part M2 are each circular in planar shape, and a surface of the sidewall part M3 is a convexly curved surface.

The outer package can 10 includes a container part 11 and a cover part 12 that are joined to each other. The container part 11 is sealed by the cover part 12. Specifically, the cover part 12 is welded to the container part 11.

The container part 11 is a container member having a flat and cylindrical shape and containing the battery device 40 and other components inside. The container part 11 has a hollow structure with an upper end part open and a lower end part closed, and thus has an opening 11K at the upper end part.

Note that the container part 11 includes a lower bottom part 11A corresponding to the lower bottom part M2, and a sidewall part 11B corresponding to the sidewall part M3. The sidewall part 11B is opposed to a side surface 40X of the battery device 40 to be described later. Here, the lower bottom part 11A and the sidewall part 11B are integrated with each other. Thus, the container part 11 including the lower bottom part 11A and the sidewall part 11B is physically a single member.

The cover part 12 is a substantially disk-shaped closing member that closes the opening 11K of the container part 11, and is welded to the container part 11 at the opening 11K as described above. Note that the cover part 12 is not particularly limited in three-dimensional shape, as long as being able to close the opening 11K. Specifically, without being limited to a substantially disk-shaped structure, the cover part 12 may have a hollow structure similar to that of the container part 11, that is, a hollow structure with a lower end part open and an upper end part closed. The external terminal 20 is attached to the cover part 12, and the cover part 12 thus supports the external terminal 20. The cover part 12 has a through hole 12K to allow the external terminal 20 and the battery device 40 to be coupled to each other.

Here, the cover part 12 is so bent as to protrude in part toward the inside of the container part 11. The cover part 12 is thus recessed in part. In this case, a portion of the cover part 12 is so bent as to form a level difference toward a center of the cover part 12. Accordingly, the cover part 12 is so bent as to protrude in part toward the inside of the container part 11, thus having a recessed part 12H. The through hole 12K is provided in the recessed part 12H.

As described above, the outer package can 10 is a so-called welded can in which two members (the container part 11 and the cover part 12) are welded to each other. As a result, the outer package can 10 after undergoing welding is physically a single member as a whole, and is thus in a state of being not separable into the two members (the container part 11 and the cover part 12) afterward.

The outer package can 10 as a welded can does not include any portion folded over another portion, and does not include any portion in which two or more members lie over each other.

The wording "does not include any portion folded over another portion" means that the outer package can 10 is not so processed (subjected to bending processing) as to include a portion folded over another portion. The wording "does not include any portion in which two or more members lie over each other" means that the outer package can 10 after completion of the secondary battery is physically a single member and is thus not separable into two or more members afterward. That is, a state of the outer package can 10 in the completed secondary battery is not a state in which two or more members lie over each other and are assembled to each other in such a manner as to be separable afterward.

In particular, the outer package can 10 as a welded can is a so-called crimpless can, being different from a crimped can which is formed by means of crimping processing. A reason for employing the crimpless can is that this increases a device space volume inside the outer package can 10, and accordingly increases an energy density per unit volume of the secondary battery. The "device space volume" refers to a volume (an effective volume) of an internal space of the outer package can 10 available for containing therein the battery device 40 which is to be involved in charging and discharging reactions.

Here, the outer package can 10 including the container part 11 and the cover part 12 is electrically conductive. The outer package can 10 is coupled to the battery device 40 (the negative electrode 42) via the negative electrode lead 62. The outer package can 10 thus serves as an external coupling terminal for the negative electrode 42. A reason for employing such a configuration is that this makes it unnecessary for the secondary battery to be provided with an external coupling terminal for the negative electrode 42 separate from the outer package can 10, and thus suppresses a decrease in device space volume resulting from providing the external coupling terminal for the negative electrode 42. As a result, the device space volume increases, and accordingly, the energy density per unit volume increases.

For example, the outer package can 10 includes one or more of electrically conductive materials including, without limitation, a metal material and an alloy material. Examples of the electrically conductive materials include iron, copper, nickel, stainless steel, an iron alloy, a copper alloy, and a nickel alloy. Although the stainless steel is not particularly limited in kind, specific examples of the stainless steel include SUS304 and SUS316. Note that the container part 11 and the cover part 12 may include the same material, or may include respective different materials.

As will be described later, the outer package can 10 (the cover part 12) is insulated, via the gasket 30, from the external terminal 20 which serves as an external coupling terminal for the positive electrode 41. A reason for this is that contact (a short circuit) between the outer package can 10 (the external coupling terminal for the negative electrode 42) and the external terminal 20 (the external coupling terminal for the positive electrode 41) is prevented.

As illustrated in FIGS. 1 and 2, the external terminal 20 is a coupling terminal to be coupled to electronic equipment when the secondary battery is mounted on the electronic equipment. As described above, the external terminal 20 is attached to the outer package can 10 (the cover part 12), and is thus supported by the cover part 12.

Here, the external terminal 20 is coupled to the battery device 40 (the positive electrode 41) via the positive electrode lead 61. The external terminal 20 thus serves as the external coupling terminal for the positive electrode 41. Accordingly, upon use of the secondary battery, the secondary battery is coupled to electronic equipment via the external terminal 20 (the external coupling terminal for the positive electrode 41) and the outer package can 10 (the external coupling terminal for the negative electrode 42). This allows the electronic equipment to operate with use of the secondary battery as a power source.

The external terminal 20 is a flat and substantially plate-shaped member, and is disposed inside the recessed part 12H with the gasket 30 interposed therebetween. The external terminal 20 is thus insulated from the cover part 12 via the gasket 30 as described above. Here, the external terminal 20 is placed inside the recessed part 12H so as not to protrude above the cover part 12. A reason for this is that this reduces the height H of the secondary battery and therefore increases the energy density per unit volume as compared with a case where the external terminal 20 protrudes above the cover part 12.

Note that the external terminal 20 has an outer diameter smaller than an inner diameter of the recessed part 12H. Thus, the external terminal 20 is separated from the cover part 12 surrounding the external terminal 20. Accordingly, the gasket 30 is disposed only in a portion of a space between the external terminal 20 and the cover part 12 inside the recessed part 12H. More specifically, the gasket 30 is disposed only at a location where the external terminal 20 and the cover part 12 would be in contact with each other if it were not for the gasket 30.

The external terminal 20 includes one or more of electrically conductive materials including, without limitation, a metal material and an alloy material. Examples of the electrically conductive materials include aluminum and an aluminum alloy. Note that the external terminal 20 may include a cladding material. The cladding material includes an aluminum layer and a nickel layer that are disposed in order from a side closer to the gasket 30. In the cladding material, the aluminum layer and the nickel layer are roll-bonded to each other.

The gasket 30 is an insulating member disposed between the outer package can 10 (the cover part 12) and the external terminal 20, as illustrated in FIG. 2. The external terminal 20 is fixed to the cover part 12 via the gasket 30. Here, the gasket 30 is ring-shaped in a plan view, and has a through hole at a location corresponding to the through hole 12K. Note that the gasket 30 is not particularly limited in planar shape, and the planar shape may be changed as desired. The gasket 30 includes one or more of insulating materials including, without limitation, a polymer compound having an insulating property. Examples of the insulating materials include polypropylene and polyethylene.

A range of placement of the gasket 30 is not particularly limited, and may be chosen as desired. Here, the gasket 30 is disposed between a top surface of the cover part 12 and a bottom surface of the external terminal 20 inside the recessed part 12H.

The battery device 40 is a power generation device that causes charging and discharging reactions to proceed. As illustrated in FIGS. 2 to 5, the battery device 40 is contained inside the outer package can 10. The battery device 40 includes the positive electrode 41, the negative electrode 42, the separator 43, and an electrolytic solution which is a liquid electrolyte. The electrolytic solution is not illustrated.

The battery device 40 to be described here is a so-called wound electrode body. That is, in the battery device 40, the positive electrode 41 and the negative electrode 42 are stacked on each other with the separator 43 interposed therebetween, and the stack of the positive electrode 41, the negative electrode 42, and the separator 43 is wound. The positive electrode 41 and the negative electrode 42 are opposed to each other with the separator 43 interposed therebetween, and are wound. As a result, the battery device 40 has a winding center space 40K. The winding center space 40K is a space provided at a center of the battery device 40, that is, a center around which the positive electrode 41, the negative electrode 42, and the separator 43 are wound. The winding center space 40K is not involved in charging and discharging reactions because neither the positive electrode 41 nor the negative electrode 42 is present therein.

Here, the positive electrode 41, the negative electrode 42, and the separator 43 are wound in such a manner that the separator 43 is disposed in each of an outermost wind and an innermost wind. Respective numbers of winds of the positive electrode 41, the negative electrode 42, and the separator 43 are not particularly limited, and may be chosen as desired.

The battery device 40 has a three-dimensional shape similar to that of the outer package can 10. The battery device 40 thus has a flat and cylindrical three-dimensional shape. That is, the battery device 40 has an outer diameter VD and a height VH respectively corresponding to the outer diameter D and the height H of the secondary battery. A reason for this is that this helps to prevent a dead space (a surplus space between the outer package can 10 and the battery device 40) from resulting when the battery device 40 is placed inside the outer package can 10, and to thereby allow for efficient use of the internal space of the outer package can 10, as compared with a case where the battery device 40 has a three-dimensional shape different from that of the outer package can 10. As a result, the device space volume increases, and accordingly, the energy density per unit volume increases.

Note that the battery device 40 has a flat and cylindrical three-dimensional shape as described above, and thus includes an opposed surface 40Y opposed to the cover part 12, and the side surface 40X coupled to the opposed surface 40Y. The opposed surface 40Y is circular in planar shape, and a surface of the side surface 40X is a convexly curved surface.

As illustrated in FIG. 5, the positive electrode 41 includes a positive electrode current collector 41A and a positive electrode active material layer 41B.

The positive electrode current collector 41A has two opposed surfaces on each of which the positive electrode active material layer 41B is to be provided. The positive electrode current collector 41A includes an electrically conductive material such as a metal material. Examples of the metal material include aluminum.

The positive electrode active material layer 41B is provided on each of the two opposed surfaces of the positive electrode current collector 41A. The positive electrode active material layer 41B includes one or more of positive electrode active materials into which lithium is insertable and from which lithium is extractable. Note that the positive electrode active material layer 41B may further include other materials including, without limitation, a positive electrode binder and a positive electrode conductor. The positive electrode active material layer 41B may be provided only on one of the two opposed surfaces of the positive electrode current collector 41A, on a side where the positive electrode 41 is opposed to the negative electrode 42. A method of forming the positive electrode active material layer 41B is not particularly limited, and specific examples thereof include a coating method.

The positive electrode active material includes a lithium compound. The term "lithium compound" is a generic term for a compound that includes lithium as a constituent element. More specifically, the lithium compound is a compound that includes lithium and one or more transition metal elements as constituent elements. A reason for this is that a high energy density is obtainable. Note that the lithium compound may further include one or more of other elements (elements other than lithium and transition metal elements). Although not particularly limited in kind, the lithium compound is specifically an oxide, a phosphoric acid compound, a silicic acid compound, or a boric acid compound, for example. Specific examples of the oxide include $LiNiO_2$, $LiCoO_2$, and $LiMn_2O_4$. Specific examples of the phosphoric acid compound include $LiFePO_4$ and $LiMnPO_4$.

The positive electrode binder includes one or more of materials including, without limitation, a synthetic rubber and a polymer compound. Examples of the synthetic rubber include a styrene-butadiene-based rubber. Examples of the polymer compound include polyvinylidene difluoride. The positive electrode conductor includes one or more of electrically conductive materials including, without limitation, a carbon material. Examples of the carbon material include graphite, carbon black, acetylene black, and Ketjen black. The electrically conductive material may be a metal material or a polymer compound, for example.

As illustrated in FIG. 5, the negative electrode 42 includes a negative electrode current collector 42A and a negative electrode active material layer 42B.

The negative electrode current collector 42A has two opposed surfaces on each of which the negative electrode active material layer 42B is to be provided. The negative electrode current collector 42A includes an electrically conductive material such as a metal material. Examples of the metal material include copper.

The negative electrode active material layer 42B is provided on each of the two opposed surfaces of the negative electrode current collector 42A. The negative electrode active material layer 42B includes one or more of negative electrode active materials into which lithium is insertable and from which lithium is extractable. Note that the negative electrode active material layer 42B may further include other materials including, without limitation, a negative electrode binder and a negative electrode conductor. The negative electrode active material layer 42B may be provided only on one of the two opposed surfaces of the negative electrode current collector 42A, on a side where the negative electrode 42 is opposed to the positive electrode 41. Details of the negative electrode binder are similar to those of the positive electrode binder. Details of the negative electrode conductor are similar to those of the positive electrode conductor. A method of forming the negative electrode active material layer 42B is not particularly limited, and specifically includes one or more of methods including, without limitation, a coating method, a vaporphase method, a liquid-phase method, a thermal spraying method, and a firing (sintering) method.

The negative electrode active material includes a carbon material, a metal-based material, or both, for example. A reason for this is that a high energy density is obtainable. Examples of the carbon material include graphitizable carbon, non-graphitizable carbon, and graphite (natural graphite and artificial graphite). The metal-based material is a material that includes, as a constituent element or constituent elements, one or more elements among metal elements and metalloid elements that are each able to form an alloy with lithium. Examples of such metal elements and metalloid elements include silicon, tin, or both. The metal-based material may be a simple substance, an alloy, a compound, a mixture of two or more thereof, or a material including two or more phases thereof. Specific examples of the metal-based material include $TiSi_2$ and $SiO_x$ ($0<x\leq 2$ or $0.2<x<1.4$).

Here, the negative electrode 42 has a height greater than a height of the positive electrode 41. In this case, the negative electrode 42 protrudes upward relative to the positive electrode 41, and protrudes downward relative to the positive electrode 41. This is for the purpose of suppressing precipitation of lithium ions extracted from the positive electrode 41 on a surface of the negative electrode 42. The "height" is a dimension corresponding to the height H of the secondary battery described above, that is, a dimension in a vertical direction in each of FIGS. 1 and 2. The definition of the height described here applies also to the following.

The separator 43 is an insulating porous film interposed between the positive electrode 41 and the negative electrode 42 as illustrated in FIGS. 2 and 5. The separator 43 allows lithium ions to pass therethrough while preventing a short circuit between the positive electrode 41 and the negative electrode 42. The separator 43 includes a polymer compound such as polyethylene.

Here, the separator 43 has a height greater than the height of the negative electrode 42. In this case, the separator 43 protrudes upward relative to the negative electrode 42, and protrudes downward relative to the negative electrode 42. This is for the purpose of suppressing contact of the positive electrode 41 and the outer package can 10 (the container part 11 and the cover part 12) with each other.

The electrolytic solution includes a solvent and an electrolyte salt. The positive electrode 41, the negative electrode 42, and the separator 43 are each impregnated with the electrolytic solution. The solvent includes one or more of non-aqueous solvents (organic solvents) including, without limitation, a carbonic-acid-ester-based compound, a carboxylic-acid-ester-based compound, and a lactone-based compound. An electrolytic solution including any of the non-aqueous solvents is a so-called non-aqueous electrolytic solution. The electrolyte salt includes one or more of light metal salts including, without limitation, a lithium salt.

The heat-resistant tape 50 is a heat-resistant member having an insulating property and disposed between the outer package can 10 and the battery device 40 as illustrated in FIGS. 2 to 4. The heat-resistant tape 50 has a substantially cylindrical structure along a peripheral surface of the battery device 40 which is the wound electrode body, and covers from the opposed surface 40Y to the side surface 40X of the battery device 40.

That is, the heat-resistant tape 50 continuously extends along each of the side surface 40X and the opposed surface 40Y, and covers both the side surface 40X and the opposed surface 40Y. In other words, the heat-resistant tape 50 extends from the side surface 40X to the opposed surface 40Y via a coupling point between the side surface 40X and the opposed surface 40Y, thus covering the coupling point, and has a structure in which a portion covering the side surface 40X and a portion covering the opposed surface 40Y are coupled (integrated) with each other. Accordingly, the heat-resistant tape 50 continuously covers from the opposed surface 40Y to the side surface 40X, although physically being a single member, i.e., a continuous body. In FIG. 4, the heat-resistant tape 50 is shaded.

By covering the side surface 40X of the battery device 40, the heat-resistant tape 50 serves as a fixing member that fixes the positive electrode 41, the negative electrode 42, and the separator 43 each wound.

Further, as will be described later, the heat-resistant tape 50 serves as a protective member that thermally protects the battery device 40 in a process of manufacturing the secondary battery (a process of forming the outer package can 10). Details of this role of thermally protecting the battery device 40 will be described later.

Although not specifically illustrated here, the heat-resistant tape 50 is an adhesive tape in which an adhesive layer is provided on a base layer, and is thus adhered to the battery device 40 (both the side surface 40X and the opposed surface 40Y) via the adhesive layer. A reason for this is that the heat-resistant tape 50 is fixed to the battery device 40, which makes it easier to keep a state in which the side surface 40X and the opposed surface 40Y are each covered by the heat-resistant tape 50. Alternatively, the heat-resistant tape 50 may be a non-adhesive tape without an adhesive layer, and may thus be adhered to the battery device 40 via an additionally provided adhesive. The heat-resistant tape 50 may be adhered only to either the side surface 40X or the opposed surface 40Y.

The heat-resistant tape 50 includes one or more of materials (heat-resistant materials) having higher heat resistance than the battery device 40. This is for the purpose of allowing the heat-resistant tape 50 to thermally protect the battery device 40. A kind of the heat-resistant material is not particularly limited, and may be chosen as desired.

In particular, the heat-resistant tape 50 preferably has a melting point higher than a shutdown temperature of the separator 43, and the heat-resistant material thus preferably has a melting point higher than the shutdown temperature of the separator 43. A reason for this is that this makes it easier for the heat-resistant tape 50 to sufficiently thermally protect the battery device 40.

The "shutdown temperature" is a temperature at which a shutdown occurs in the separator 43, more specifically, a temperature at which a large number of pores present in the separator 43 are shielded due to a melting phenomenon. A shutdown in the separator 43 results in a rise in internal resistance of the battery device 40, which suppresses an abrupt rise in temperature of the battery device 40. This helps to prevent the secondary battery from exhibiting thermal runaway easily.

For example, the heat-resistant material preferably includes one or more of materials including, without limitation, polyimide, polyamide, acetal, polyethersulfone, polyetheretherketone, polyphenylenesulfide, polytetrafluoroethylene, and polyethylene terephthalate. A reason for this is that a material such as polyimide has a high melting point (or a high thermal decomposition temperature), which makes it easier for the heat-resistant tape 50 to sufficiently thermally protect the battery device 40.

The heat-resistant tape 50 is not particularly limited in thickness. However, it is preferable that the thickness be sufficiently small within a range in which the heat-resistant tape 50 is able to thermally protect the battery device 40. A reason for this is that this helps to prevent the device space volume from decreasing easily even if the heat-resistant tape 50 is contained inside the outer package can 10, which increases the energy density per unit volume.

For example, the thickness of the heat-resistant tape 50 is preferably less than or equal to 30 μm. A reason for this is that this makes the thickness of the heat-resistant tape 50 sufficiently small, which helps to prevent the presence of the heat-resistant tape 50 from influencing the device space volume easily, that is, to sufficiently prevent the device space volume from decreasing easily.

Here, a distance, i.e., a clearance, between the outer package can 10 and the battery device 40 is not particularly limited, and may be chosen as desired. In particular, to make the device space volume sufficiently large even if the heat-resistant tape 50 is contained inside the outer package can 10, it is preferable that the distance between the outer package can 10 and the battery device 40 be sufficiently small.

For example, a distance L1 from the outer package can 10 (the sidewall part 11B of the container part 11) to the battery device 40 (the side surface 40X) is less than or equal to 0.5 mm. A distance L2 from the outer package can (the cover part 12) to the battery device 40 (the opposed surface 40Y) is less than or equal to 0.5 mm.

Note that the heat-resistant tape 50 includes a heat-resistant part 50X covering the side surface 40X, and a heat-resistant part 50Y covering the opposed surface 40Y. As described above, the heat-resistant parts 50X and 50Y are integrated with each other to cover from the opposed surface 40Y to the side surface 40X.

A range in which the heat-resistant part 50X covers the side surface 40X is not particularly limited. That is, the heat-resistant part 50X may cover the entire side surface 40X, or may cover only a portion of the side surface 40X. FIGS. 2 to 4 illustrate a case where the heat-resistant part 50X covers the entire side surface 40X.

A range in which the heat-resistant part 50Y covers the opposed surface 40Y is not particularly limited, and may be chosen as desired. In particular, the heat-resistant part 50Y preferably so covers the opposed surface 40Y as not to shield the winding center space 40K, and thus preferably covers the opposed surface 40Y around the winding center space 40K. A reason for this is that, as will be described later, this makes the winding center space 40K available as a path for supply of the electrolytic solution to a wound body 40Z in the process of manufacturing the secondary battery (a process of injecting the electrolytic solution into the outer package can 10), which makes it easier for the wound body 40Z to be impregnated with the electrolytic solution. FIG. 2 illustrates a case where the heat-resistant part 50Y covers the opposed surface 40Y on an outer side relative to the recessed part 12H.

More specifically, where an area of the opposed surface 40Y is denoted by S1, and an area of the opposed surface 40Y covered by the heat-resistant tape 50 (the heat-resistant part 50Y) is denoted by S2, a ratio (an area ratio) S of the area S2 to the area S1, i.e., (S2/S1)×100, is preferably less than or equal to 80%. A reason for this is that the opposed surface 40Y is sufficiently covered by the heat-resistant part 50Y within a range in which the heat-resistant part 50Y does not hinder the supply of the electrolytic solution into the winding center space 40K. This allows the battery device 40 to be thermally protected easily by the heat-resistant tape 50, while securing efficiency of impregnating the wound body 40Z with the electrolytic solution.

As illustrated in FIG. 2, the positive electrode lead 61 is a coupling wiring line for the positive electrode 41, being contained inside the outer package can 10 and coupling the positive electrode 41 (the positive electrode current collector 41A) to the external terminal 20. The positive electrode lead 61 is coupled to the bottom surface of the external terminal 20 via the through hole 12K provided in the cover part 12.

Here, the secondary battery includes one positive electrode lead 61. However, the secondary battery may include two or more positive electrode leads 61. A reason for this is that an increase in the number of the positive electrode leads 61 results in a decrease in electric resistance of the battery device 40.

Although not particularly limited, a method of coupling the positive electrode lead 61 is specifically a welding method. Although not particularly limited in kind, the welding method specifically includes one or more of methods including, without limitation, a resistance welding method, an ultrasonic welding method, and a laser welding method. The details of the welding methods described here apply also to the following, unless a specific kind of welding method is particularly specified in the description.

Details of a material included in the positive electrode lead 61 are similar to the details of the material included in the positive electrode current collector 41A. Note that the material included in the positive electrode lead 61 and the material included in the positive electrode current collector 41A may be the same as or different from each other.

A position of coupling of the positive electrode lead 61 to the positive electrode 41 is not particularly limited, and may be chosen as desired. That is, the positive electrode lead 61 may be coupled to the positive electrode 41 in the outermost wind, in the innermost wind, or in the middle of the winding between the outermost wind and the innermost wind. FIG. 2 illustrates a case where the positive electrode lead 61 is coupled to the positive electrode 41 in the middle of the winding.

Note that the positive electrode lead 61 is physically separate from the positive electrode current collector 41A and is thus provided separately from the positive electrode current collector 41A. Alternatively, the positive electrode lead 61 may be physically continuous with the positive electrode current collector 41A and may thus be provided integrally with the positive electrode current collector 41A.

As illustrated in FIG. 2, the negative electrode lead 62 is a coupling wiring line for the negative electrode 42, being contained inside the outer package can 10 and coupling the negative electrode 42 (the negative electrode current collector 42A) to the outer package can 10 (the container part 11). Here, the secondary battery includes one negative electrode lead 62. However, the secondary battery may include two or more negative electrode leads 62. A reason for this is that an increase in the number of the negative electrode leads 62 results in a decrease in electric resistance of the battery device 40.

Details of methods usable for the coupling of the negative electrode lead 62 are similar to the details of the methods usable for the coupling of the positive electrode lead 61. Details of a material included in the negative electrode lead 62 are similar to the details of the material included in the negative electrode current collector 42A. Note that the material included in the negative electrode lead 62 and the material included in the negative electrode current collector 42A may be the same as or different from each other.

A position of coupling of the negative electrode lead 62 to the negative electrode 42 is not particularly limited, and may be chosen as desired. That is, the negative electrode lead 62 may be coupled to the negative electrode 42 in the outermost wind, in the innermost wind, or in the middle of the winding between the outermost wind and the innermost wind. FIG. 2 illustrates a case where the negative electrode lead 62 is coupled to the negative electrode 42 in the outermost wind.

Note that the negative electrode lead 62 is physically separate from the negative electrode current collector 42A and is thus provided separately from the negative electrode current collector 42A. Alternatively, the negative electrode lead 62 may be physically continuous with the negative electrode current collector 42A and may thus be provided integrally with the negative electrode current collector 42A.

Note that the secondary battery may further include one or more of other unillustrated components.

For example, the secondary battery includes a safety valve mechanism. The safety valve mechanism cuts off electrical coupling between the outer package can 10 and the battery device 40 (the negative electrode 42) if an internal pressure of the outer package can 10 reaches a certain level or higher. Examples of a factor that causes the internal pressure of the outer package can 10 to reach the certain level or higher include an internal short circuit and heating of the secondary battery. The safety valve mechanism is not particularly limited in placement location, as long as being placed in the outer package can 10. In particular, the safety valve mechanism is preferably placed on either the container part 11 (the lower bottom part 11A) or the cover part 12, more preferably the lower bottom part 11A to which no external terminal 20 is attached.

Further, the secondary battery includes an insulating film between the outer package can 10 and the battery device 40. The insulating film may be disposed between the cover part 12 and the battery device 40, between the container part 11 (the lower bottom part 11A) and the battery device 40, or at both of these locations. This allows the insulating film to suppress contact of the outer package can 10 and the battery device 40 (the positive electrode 41) with each other.

Further, the secondary battery includes a sealant that covers a periphery of the positive electrode lead 61. The sealant includes one or more of insulating materials including, without limitation, polyimide.

Note that the outer package can 10 is provided with a cleavage valve. The cleavage valve cleaves to release the internal pressure of the outer package can 10 in a case where the internal pressure reaches a certain level or higher. The cleavage valve is not particularly limited in placement location, as long as being placed in the outer package can 10. In particular, as with the placement location of the safety valve mechanism described above, the cleavage valve is preferably placed on either the container part 11 (the lower bottom part 11A) or the cover part 12, more preferably the lower bottom part 11A.

Upon charging of the secondary battery, in the battery device 40, lithium is extracted from the positive electrode 41, and the extracted lithium is inserted into the negative electrode 42 via the electrolytic solution. Upon discharging of the secondary battery, in the battery device 40, lithium is extracted from the negative electrode 42, and the extracted lithium is inserted into the positive electrode 41 via the electrolytic solution. Upon the charging and the discharging, lithium is inserted and extracted in an ionic state.

Figure 6:
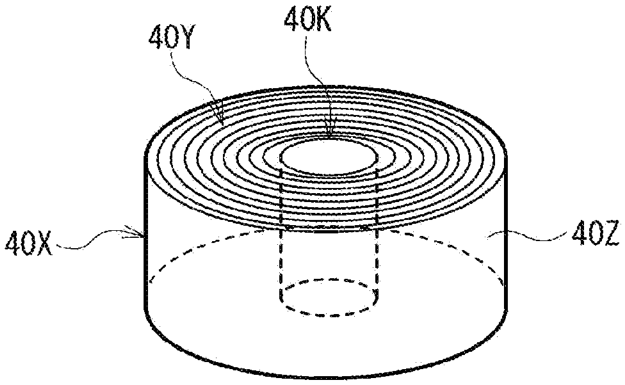
FIG. 6 is a perspective view for describing a process of manufacturing the secondary battery.
Figure 7:
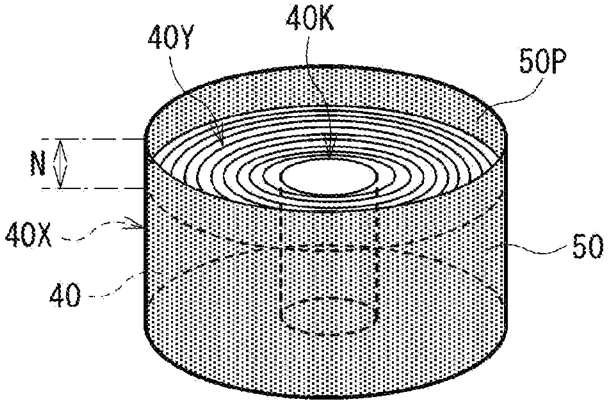
FIG. 7 is a perspective view for describing a process of manufacturing the secondary battery that follows FIG. 6.
Figure 8:
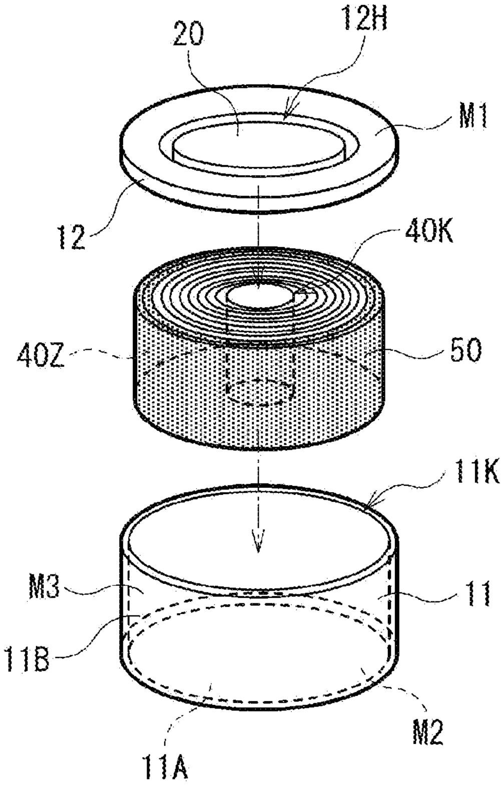
FIG. 8 is a perspective view for describing a process of manufacturing the secondary battery that follows FIG. 7.
Figure 9:
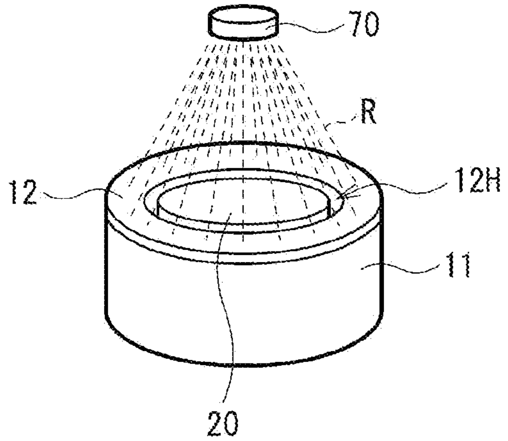
FIG. 9 is a perspective view for describing a process of manufacturing the secondary battery that follows FIG. 8.

FIGS. 6 and 7 each illustrate a perspective configuration corresponding to FIG. 4 to describe the process of manufacturing the secondary battery. FIGS. 8 and 9 each illustrate a perspective configuration corresponding to FIG. 1 to describe the process of manufacturing the secondary battery.

Note that FIG. 8 illustrates a state where the cover part 12 is yet to be welded to the container part 11 and is thus separate from the container part 11. FIG. 9 illustrates a light source 70 to be used in a welding process using a laser welding method, together with the outer package can 10 (the container part 11 and the cover part 12). In each of FIGS. 6 to 8, for simplifying the illustration, the positive electrode lead 61 and the negative electrode lead 62 are each omitted.

In the following description, where appropriate, FIGS. 1 to 5 described already will be referred to in conjunction with FIGS. 6 to 9.

In the process of manufacturing the secondary battery, as illustrated in FIG. 8, the container part 11 and the cover part 12 that are physically separate from each other are used to form the outer package can 10. The container part 11 is a member in which the lower bottom part 11A and the sidewall part 11B are integrated with each other, and has the opening 11K as described above. The external terminal 20 is attached in advance, via the gasket 30, to the recessed part 12H provided in the cover part 12.

Alternatively, the lower bottom part 11A and the sidewall part 11B may be physically separate from each other, and the container part 11 may thus be formed by welding the sidewall part 11B to the lower bottom part 11A.

First, the positive electrode active material is mixed with other materials including, without limitation, the positive electrode binder and the positive electrode conductor to thereby obtain a positive electrode mixture. Thereafter, the positive electrode mixture is put into a solvent such as an organic solvent to thereby prepare a paste positive electrode mixture slurry. Thereafter, the positive electrode mixture slurry is applied on the two opposed surfaces of the positive electrode current collector 41A to thereby form the positive electrode active material layers 41B. Lastly, the positive electrode active material layers 41B are compression-molded by means of, for example, a roll pressing machine. In this case, the positive electrode active material layers 41B may be heated. The positive electrode active material layers 41B may be compression-molded multiple times. In this manner, the positive electrode 41 is fabricated.

First, the negative electrode active material is mixed with other materials including, without limitation, the negative electrode binder and the negative electrode conductor to thereby obtain a negative electrode mixture. Thereafter, the negative electrode mixture is put into a solvent such as an organic solvent to thereby prepare a paste negative electrode mixture slurry. Thereafter, the negative electrode mixture slurry is applied on the two opposed surfaces of the negative electrode current collector 42A to thereby form the negative electrode active material layers 42B. Lastly, the negative electrode active material layers 42B are compression-molded by means of, for example, a roll pressing machine. Details of the compression molding of the negative electrode active material layers 42B are similar to the details of the compression molding of the positive electrode active material layers 41B. In this manner, the negative electrode 42 is fabricated.

The electrolyte salt is put into the solvent. The electrolyte salt is thereby dispersed or dissolved in the solvent. Thus, the electrolytic solution is prepared.

First, by means of a method such as a welding method, the positive electrode lead 61 is coupled to the positive electrode 41 (the positive electrode current collector 41A), and the negative electrode lead 62 is coupled to the negative electrode 42 (the negative electrode current collector 42A).

Thereafter, the positive electrode 41 with the positive electrode lead 61 coupled thereto and the negative electrode 42 with the negative electrode lead 62 coupled thereto are stacked on each other with the separator 43 interposed therebetween, following which the stack of the positive electrode 41, the negative electrode 42, and the separator 43 is wound to thereby fabricate the wound body 40Z having the side surface 40X and the opposed surface 40Y, as illustrated in FIG. 6. The wound body 40Z has a configuration similar to that of the battery device 40 except that the positive electrode 41, the negative electrode 42, and the separator 43 are each unimpregnated with the electrolytic solution.

Thereafter, as illustrated in FIG. 7, the heat-resistant tape 50 is adhered to the side surface 40X of the wound body 40Z. In this case, the heat-resistant tape 50 is made to have a height larger than a height of the wound body 40Z to thereby make the heat-resistant tape 50 protrude above the wound body 40Z. As a result, the heat-resistant tape 50 includes a protruding part 50P protruding above the wound body 40Z, and the protruding part 50P has a protrusion length N. The protrusion length N is a dimension of the heat-resistant tape 50 corresponding to the height VH.

Thereafter, the protruding part 50P is subjected to a pressing process to be pressed against the battery device 40 to thereby closely attach the protruding part 50P to the opposed surface 40Y. As a result, as illustrated in FIG. 4, the heat-resistant tape 50 is adhered to both the side surface 40X and the opposed surface 40Y, and the heat-resistant tape 50 including the heat-resistant part 50Y (the protruding part 50P) together with the heat-resistant part 50X is thus fixed to the wound body 40Z.

Thereafter, as illustrated in FIG. 8, the wound body 40Z with the positive electrode lead 61 and the negative electrode lead 62 each coupled thereto and the heat-resistant tape 50 adhered thereto is placed into the container part 11 through the opening 11K. In this case, the negative electrode lead 62 is coupled to the container part 11 (the lower bottom part 11A) by means of a method such as a welding method. As a result, the heat-resistant tape 50 is disposed between the container part 11 (the sidewall part 11B) and the wound body 40Z.

Thereafter, the electrolytic solution is injected into the container part 11 through the opening 11K. The wound body 40Z (including the positive electrode 41, the negative electrode 42, and the separator 43) is thereby impregnated with the electrolytic solution. Thus, the battery device 40 which is the wound electrode body is fabricated. In this case, a portion of the electrolytic solution is supplied into the winding center space 40K, and the wound body 40Z is thus impregnated with the electrolytic solution from the inside of the winding center space 40K.

Thereafter, the opening 11K is closed with use of the cover part 12 with the external terminal 20 attached thereto via the gasket 30, following which the cover part 12 is welded to the container part 11 by means of a laser welding method as illustrated in FIG. 9. In this case, the positive electrode lead 61 is coupled to the external terminal 20 via the through hole 12K, by means of a method such as a welding method.

In the welding process using the laser welding method, an outer edge part of the cover part 12 is irradiated with laser light R from the light source 70. In this case, the outer edge part of the cover part 12 is heated by the laser light R, and the cover part 12 is thus welded to the container part 11 at the outer edge part.

The container part 11 and the cover part 12 are thus joined to each other. In this manner, the outer package can 10 is formed, and the components including, without limitation, the battery device 40 and the heat-resistant tape 50 are contained inside the outer package can 10. The secondary battery is thus assembled.

The secondary battery after being assembled is charged and discharged. Various conditions including, for example, an environment temperature, the number of times of charging and discharging (the number of cycles), and charging and discharging conditions, may be chosen as desired. As a result, a film is formed on a surface of, for example, the negative electrode 42. This brings the secondary battery into an electrochemically stable state.

As a result, the components including, without limitation, the battery device 40 and the heat-resistant tape 50 are sealed in the outer package can 10. The secondary battery is thus completed.

According to the secondary battery, the battery device 40 having the opposed surface 40Y and the side surface 40X is contained inside the outer package can 10 including the container part 11 and the cover part 12, and the cover part 12 is welded to the container part 11. Further, the heat-resistant tape 50 is disposed between the outer package can 10 and the battery device 40, and the heat-resistant tape 50 covers from the opposed surface 40Y to the side surface 40X. This makes it possible to suppress occurrence of a short circuit while securing the battery capacity for the following reasons.

Figure 10:
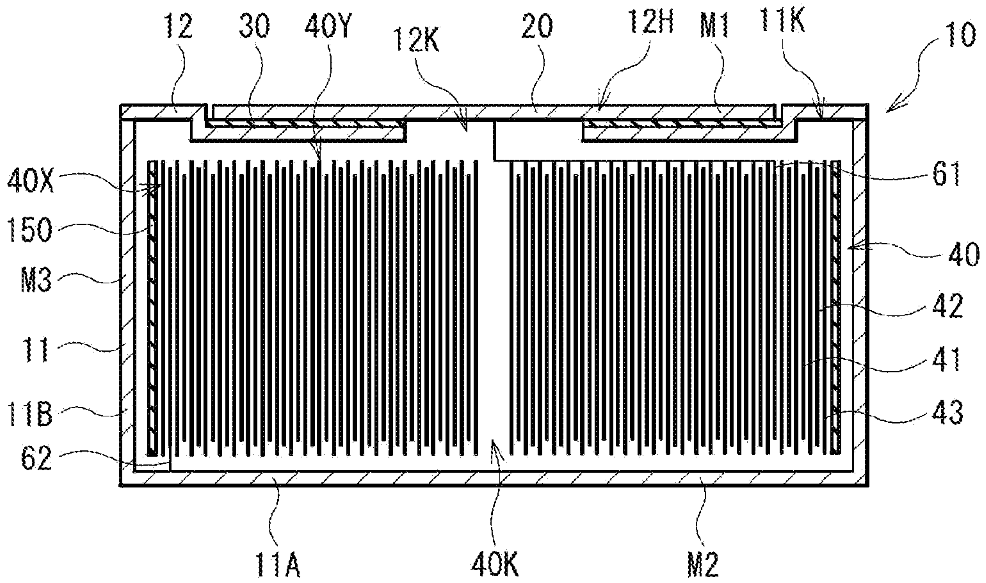
FIG. 10 is a sectional view of a configuration of a secondary battery of a comparative example.

FIG. 10 illustrates a sectional configuration of a secondary battery of a comparative example, and corresponds to FIG. 2. The secondary battery of the comparative example has a configuration similar to that of the secondary battery of an embodiment, except that the secondary battery of the comparative example includes a heat-resistant tape 150 instead of the heat-resistant tape 50, and is manufactured by a manufacturing method similar to the method of manufacturing the secondary battery of an embodiment. The heat-resistant tape 150 has a configuration similar to that of the heat-resistant tape 50, except that the heat-resistant tape 150 includes only the heat-resistant part 50X without including the heat-resistant part 50Y, and thus covers only the side surface 40X without covering the opposed surface 40Y.

In the secondary battery of the comparative example, the heat-resistant tape 150 covers the side surface 40X, and thus serves as a fixing member as with the heat-resistant tape 50. However, the heat-resistant tape 150 does not cover the opposed surface 40Y, and thus does not serve as a protective member, unlike the heat-resistant tape 50.

Here, even if the heat-resistant tape 150 covers a surface (the side surface 40X) of the battery device 40, the thickness of the heat-resistant tape 150 does not have to be excessively large, i.e., may be sufficiently small. In this case, the device space volume hardly decreases even if the heat-resistant tape 150 is contained together with the battery device 40 inside the outer package can 10. This results in an increase in volume of the battery device 40, thus securing the battery capacity.

However, in a case where the heat-resistant tape 150 is used, a manufacturing process issue occurs that influences an operation characteristic of the secondary battery. Specifically, as illustrated in FIGS. 9 and 10, in the process of forming the outer package can 10 (a process of welding the cover part 12 to the container part 11 by means of a laser welding method), the cover part 12 is joined to the container part 11 if the outer edge part of the cover part 12 is heated by the laser light R.

In this case, the battery device 40 is excessively heated in the vicinity of the outer edge part of the cover part 12, which causes the separator 43 to be damaged easily. Specifically, the separator 43 undergoes thermal contraction, and the separator 43 is broken in some cases. Damage to the separator 43 makes the positive electrode 41 and the negative electrode 42 easily come into contact with each other, which causes a short circuit to easily occur.

Based upon the foregoing, in the secondary battery of the comparative example, the battery capacity is secured, but a short circuit easily occurs. It is thus difficult to suppress occurrence of a short circuit while securing the battery capacity.

In the secondary battery of an embodiment, as illustrated in FIGS. 2 and 9, even if the outer edge part of the cover part 12 is heated due to irradiation with the laser light R in the process of forming the outer package can 10, the battery device 40 is thermally protected by the heat-resistant tape 50 because the heat-resistant tape 50 covers the opposed surface 40Y.

In this case, the battery device 40 is not excessively heated in the vicinity of the outer edge part of the cover part 12, which helps to prevent the separator 43 from being damaged easily. This makes the positive electrode 41 and the negative electrode 42 easily come into contact with each other, which helps to prevent a short circuit from occurring easily.

Moreover, the heat-resistant tape 50 covering from the opposed surface 40Y to the side surface 40X not only serves as a protective member that thermally protects the battery device 40 in the process of forming the outer package can 10, but also serves as a fixing member that fixes the winding of the battery device 40.

Accordingly, even if a location range of the heat-resistant tape 50 is extended from the side surface 40X to the opposed surface 40Y to allow the heat-resistant tape 50 to serve as both the fixing member and the protective member, the location range of the heat-resistant tape 50 increases only slightly. Further, for the heat-resistant tape 50 to play the two roles described above, the thickness of the heat-resistant tape 50 may be sufficiently small as described above.

As a result, the device space volume hardly decreases even if the heat-resistant tape 50 is contained together with the battery device 40 inside the outer package can 10. This increases the volume of the battery device 40.

Based upon the foregoing, in the secondary battery of an embodiment, the battery capacity increases and a short circuit is prevented from occurring easily. It is thus possible to suppress occurrence of a short circuit while securing the battery capacity.

In addition, in the heat-resistant tape 50, the heat-resistant part 50X covering the side surface 40X and the heat-resistant part 50Y covering the opposed surface 40Y are integrated with each other. Accordingly, as compared with a case where the heat-resistant parts 50X and 50Y are separated from each other, the number of components of the secondary battery decreases. This makes it possible to reduce manufacturing cost of the secondary battery, and to easily manufacture the secondary battery.

In particular, the heat-resistant tape 50 may have a melting point higher than the shutdown temperature of the separator 43. This makes it easier for the heat-resistant tape 50 to sufficiently thermally protect the battery device 40, making it possible to achieve higher effects.

Further, the heat-resistant tape 50 may include polyimide. This makes it easier for the heat-resistant tape 50 to sufficiently thermally protect the battery device 40, making it possible to achieve higher effects.

Further, the heat-resistant tape 50 may be adhered to both the opposed surface 40Y and the side surface 40X. This makes it easier to keep the state in which the side surface 40X and the opposed surface 40Y are each covered by the heat-resistant tape 50. Accordingly, it is possible to achieve higher effects.

Further, the distance L1 may be less than or equal to 0.5 mm and the distance L2 may be less than or equal to 0.5 mm. This makes each of distances L1 and L2, i.e., so-called clearances, sufficiently small, while allowing the heat-resistant tape 50 to be disposed between the outer package can 10 and the battery device 40. As a result, the device space volume is sufficiently large even if the heat-resistant tape 50 is contained together with the battery device 40 inside the outer package can 10. Accordingly, it is possible to achieve higher effects.

Further, the heat-resistant tape 50 may have a thickness of less than or equal to 30 μm. This makes the device space volume sufficiently large even if the heat-resistant tape 50 is contained together with the battery device 40 inside the outer package can 10. Accordingly, it is possible to achieve higher effects.

Further, the heat-resistant tape 50 may so cover the opposed surface 40Y as not to shield the winding center space 40K. This makes it easier for the wound body 40Z to be impregnated with the electrolytic solution, which allows the secondary battery to hold a sufficient amount of the electrolytic solution. This results in a sufficiently large battery capacity, making it possible to achieve higher effects.

Further, the area ratio S may be less than or equal to 80%. This allows the battery device 40 to be thermally protected easily by the heat-resistant tape 50, while securing the efficiency of impregnating the wound body 40Z with the electrolytic solution. Accordingly, it is possible to achieve higher effects.

Further, the secondary battery may have a flat and columnar shape, that is, the secondary battery may be one referred to by a term such as the coin type or the button type. Even in a case of such a small-sized secondary battery which is highly constrained in terms of size, occurrence of a short circuit is suppressed while the battery capacity is secured. Accordingly, it is possible to achieve higher effects.

Further, the secondary battery may include a lithium-ion secondary battery. This makes it possible to obtain a sufficient battery capacity stably through the use of insertion and extraction of lithium. Accordingly, it is possible to achieve higher effects.

The configuration of the secondary battery described herein is appropriately modifiable, as described below, according to an embodiment. Note that any two or more of the following series of modifications may be combined with each other.

In FIG. 2, the heat-resistant part 50Y covers the opposed surface 40Y on the outer side relative to the recessed part 12H. However, the range in which the heat-resistant part 50Y covers the opposed surface 40Y may be changed as desired as described above.

Figure 11:
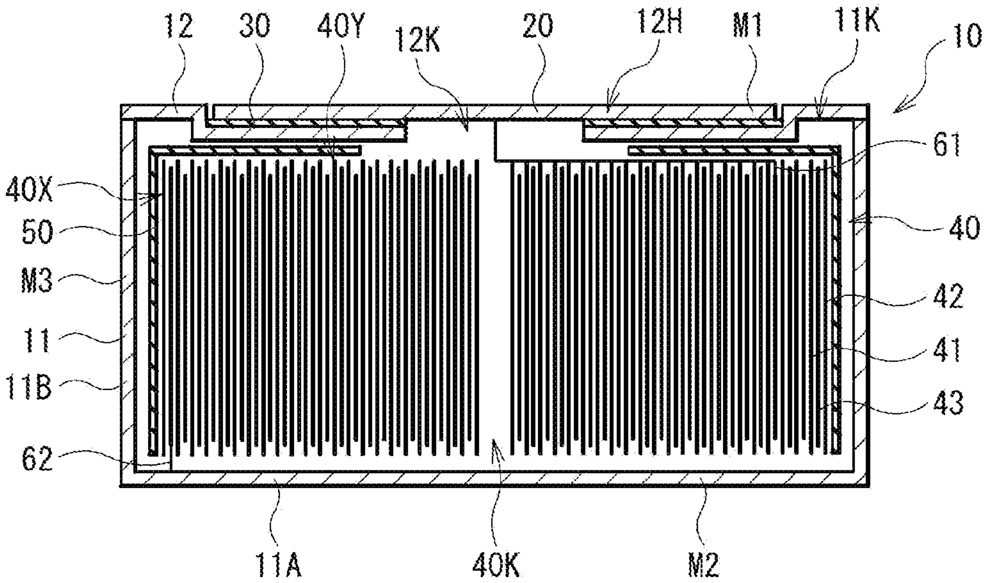
FIG. 11 is a sectional view of a configuration of a secondary battery of an embodiment.

As illustrated in FIG. 11 corresponding to FIG. 2, the heat-resistant part 50Y may be extended to an inner side relative to the recessed part 12H, and may thus cover the opposed surface 40Y up to the inner side relative to the recessed part 12H. In this case also, the battery device 40 is thermally protected by the heat-resistant tape 50 (the heat-resistant part 50Y), which makes it possible to achieve effects similar to those in the case illustrated in FIG. 2.

Note that, as described above, it is preferable that the heat-resistant part 50Y do not shield the winding center space 40K, to make it easier for the wound body 40Z to be impregnated with the electrolytic solution.

In FIG. 2, the heat-resistant part 50X of the heat-resistant tape 50 covers the entire side surface 40X of the battery device 40. However, the range in which the heat-resistant part 50X covers the side surface 40X may be changed as desired as described above.

Figure 12:
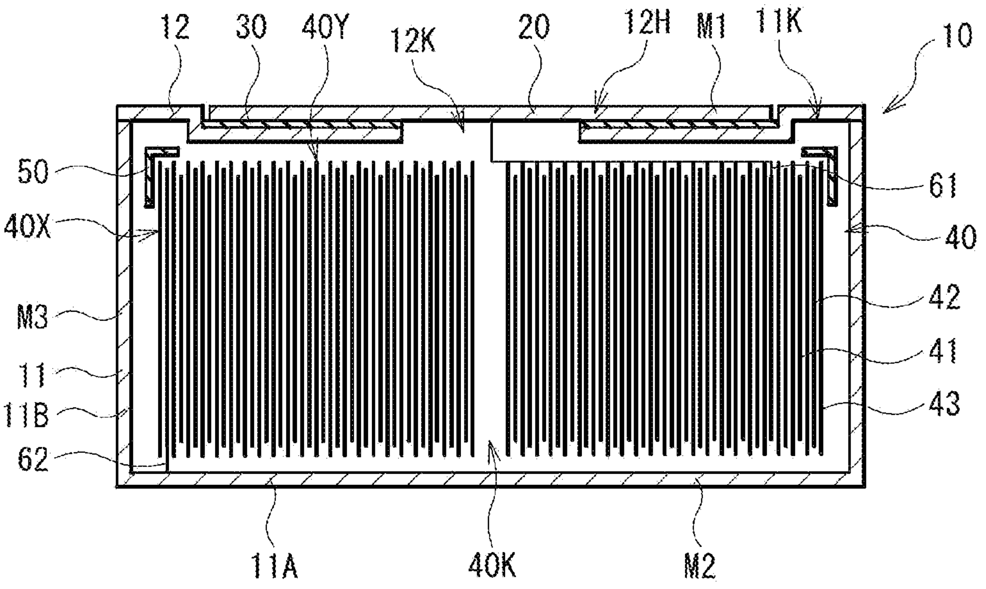
FIG. 12 is a sectional view of a configuration of a secondary battery of an embodiment.

As illustrated in FIG. 12 corresponding to FIG. 2, the heat-resistant part 50X may be shortened upward, and may thus cover only a portion of the side surface 40X. In this case also, the battery device 40 is thermally protected by the heat-resistant tape 50 (the heat-resistant part 50Y), which makes it possible to achieve effects similar to those in the case illustrated in FIG. 2.

Note that it is preferable that an area of the side surface 40X covered by the heat-resistant part 50X be sufficiently large, to sufficiently fix the winding of the battery device 40 with use of the heat-resistant part 50X.

In FIG. 2, the positive electrode 41 is coupled to the external terminal 20 via the positive electrode lead 61, and the negative electrode 42 is coupled to the outer package can 10 (the container part 11) via the negative electrode lead 62. Thus, the external terminal 20 serves as the external coupling terminal for the positive electrode 41, and the outer package can 10 serves as the external coupling terminal for the negative electrode 42.

Figure 13:
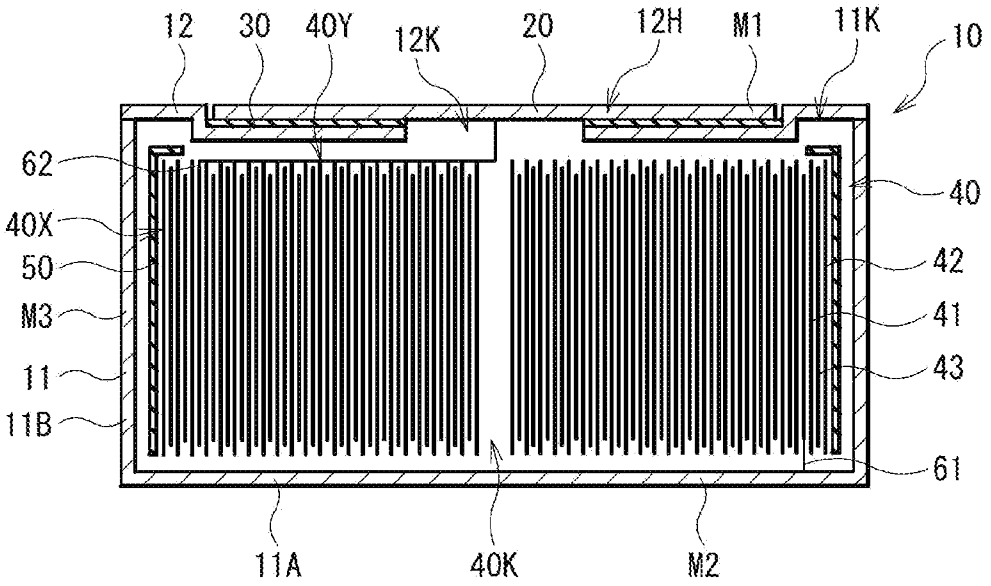
FIG. 13 is a sectional view of a configuration of a secondary battery of an embodiment.

However, as illustrated in FIG. 13 corresponding to FIG. 2, the positive electrode 41 may be coupled to the outer package can 10 (the container part 11) via the positive electrode lead 61, and the negative electrode 42 may be coupled to the external terminal 20 via the negative electrode lead 62. Thus, the outer package can 10 may serve as the external coupling terminal for the positive electrode 41, and the external terminal 20 may serve as the external coupling terminal for the negative electrode 42. Here, the negative electrode lead 62 is coupled to the negative electrode 42 in the middle of the winding, and the positive electrode lead 61 is coupled to the positive electrode 41 in the outermost wind.

In this case, to serve as the external coupling terminal for the negative electrode 42, the external terminal 20 includes one or more of electrically conductive materials including, without limitation, a metal material and an alloy material. Examples of the electrically conductive materials include iron, copper, nickel, stainless steel, an iron alloy, a copper alloy, and a nickel alloy. To serve as the external coupling terminal for the positive electrode 41, the outer package can 10 includes one or more of electrically conductive materials including, without limitation, a metal material and an alloy material. Examples of the electrically conductive materials include aluminum, an aluminum alloy, and stainless steel.

In this case also, the secondary battery is couplable to electronic equipment via the external terminal 20 (the external coupling terminal for the negative electrode 42) and the outer package can 10 (the external coupling terminal for the positive electrode 41). Accordingly, it is possible to achieve effects similar to those in the case illustrated in FIG. 2.

Figure 14:
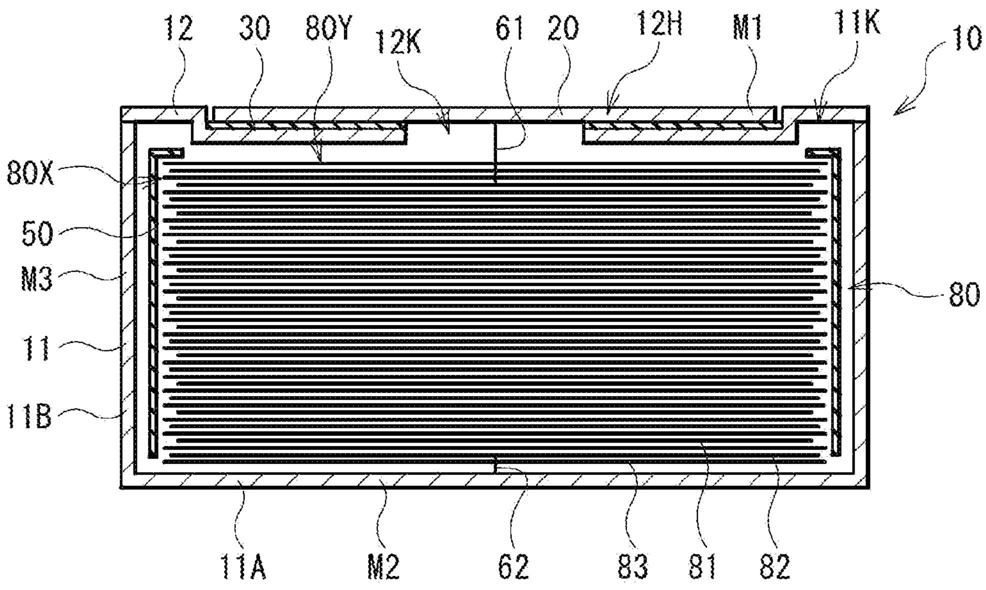
FIG. 14 is a sectional view of a configuration of a secondary battery of an embodiment.

In FIG. 2, the secondary battery includes the battery device 40 which is the wound electrode body (the positive electrode 41, the negative electrode 42, and the separator 43). However, as illustrated in FIG. 14 corresponding to FIG. 2, the secondary battery may include a battery device 80 which is a stacked electrode body (a positive electrode 81, a negative electrode 82, and a separator 83).

The battery device 80 has a configuration similar to that of the battery device 40, except for the following. The battery device 80 includes the positive electrode 81, the negative electrode 82, and the separator 83, and the positive electrode 81 and the negative electrode 82 are alternately stacked with the separator 83 interposed therebetween. Accordingly, the battery device 80 includes one or more positive electrodes 81, one or more negative electrodes 82, and one or more separators 83. Note that the battery device 80 does not have the winding center space 40K, unlike the battery device 40. Configurations of the positive electrode 81, the negative electrode 82, and the separator 83 are respectively similar to those of the positive electrode 41, the negative electrode 42, and the separator 43. That is, the battery device 80 has a side surface 80X corresponding to the side surface 40X, and an opposed surface 80Y corresponding to the opposed surface 40Y.

Here, the battery device 80 includes multiple positive electrodes 81, multiple negative electrodes 82, and multiple separators 83. Although the illustration in FIG. 14 is simplified, the secondary battery includes multiple positive electrode leads 61 coupled to respective ones of the multiple positive electrodes 81 (positive electrode current collectors), and multiple negative electrode leads 62 coupled to respective ones of the multiple negative electrodes (negative electrode current collectors) 82. The multiple positive electrode leads 61 are coupled to the external terminal 20 in a state of being joined to each other, and the multiple negative electrode leads 62 are coupled to the outer package can 10 (the container part 11) in a state of being joined to each other.

The heat-resistant tape 50 covers from the opposed surface 80Y to the side surface 80X. Accordingly, because of covering the side surface 80X, the heat-resistant tape 50 serves as a fixing member that fixes the multiple positive electrodes 81, the multiple negative electrodes 82, and the multiple separators 83 stacked on each other. Further, because of covering the opposed surface 80Y, the heat-resistant tape 50 serves as a protective member that thermally protects the battery device 80.

In this case also, the heat-resistant tape 50 serves as both the fixing member and the protective member. Accordingly, it is possible to achieve effects similar to those in the case illustrated in FIG. 2.

EXAMPLES

Examples of the present technology are described below according to an embodiment.

Examples 1 to 18 and Comparative Examples 1 to 5

Secondary batteries were fabricated, and thereafter the secondary batteries were evaluated for their performance.

[Fabrication of Secondary Batteries of Examples 1 to 18]

In accordance with a procedure described below, the secondary batteries (lithium-ion secondary batteries) of the button type illustrated in FIGS. 1 to 5 were fabricated. Note that, in each of Tables 1 and 2, to simplify the presented contents, "Examples 1 to 18" are respectively presented as "E1 to E18", and "Comparative examples 1 to 5" are respectively presented as "C1 to C5".

(Fabrication of Positive Electrode)

First, 91 parts by mass of the positive electrode active material ($LiCoO_2$), 3 parts by mass of the positive electrode binder (polyvinylidene difluoride), and 6 parts by mass of the positive electrode conductor (graphite) were mixed with each other to thereby obtain a positive electrode mixture. Thereafter, the positive electrode mixture was put into a solvent (N-methyl-2-pyrrolidone which is an organic solvent), following which the organic solvent was stirred to thereby prepare a paste positive electrode mixture slurry.

Thereafter, the positive electrode mixture slurry was applied on the two opposed surfaces of the positive electrode current collector 41A (a band-shaped aluminum foil having a thickness of 12 pin) by means of a coating apparatus, following which the applied positive electrode mixture slurry was dried to thereby form the positive electrode active material layers 41B. Lastly, the positive electrode active material layers 41B were compression-molded by means of a roll pressing machine. In this manner, the positive electrode 41 was fabricated.

(Fabrication of Negative Electrode)

First, 95 parts by mass of the negative electrode active material (graphite) and 5 parts by mass of the negative electrode binder (polyvinylidene difluoride) were mixed with each other to thereby obtain a negative electrode mixture. Thereafter, the negative electrode mixture was put into a solvent (N-methyl-2-pyrrolidone which is an organic solvent), following which the organic solvent was stirred to thereby prepare a paste negative electrode mixture slurry. Thereafter, the positive electrode mixture slurry was applied on the two opposed surfaces of the negative electrode current collector 42A (a band-shaped copper foil having a thickness of 15 μm) by means of a coating apparatus, following which the applied negative electrode mixture slurry was dried to thereby form the negative electrode active material layers 42B. Lastly, the negative electrode active material layers 42B were compression-molded by means of a roll pressing machine. In this manner, the negative electrode 42 was fabricated.

(Preparation of Electrolytic Solution)

The electrolyte salt ($LiPF_6$) was added to the solvent (ethylene carbonate and diethyl carbonate), following which the solvent was stirred. In this case, a mixture ratio (a weight ratio) between ethylene carbonate and diethyl carbonate in the solvent was set to 30:70, and a content of the electrolyte salt was set to 1 mol/kg with respect to the solvent. The electrolyte salt was thereby dissolved or dispersed in the solvent. Thus, the electrolytic solution was prepared.

(Assembly of Secondary Battery)

First, by means of a resistance welding method, the positive electrode lead 61 including aluminum was welded to the positive electrode 41 (the positive electrode current collector 41A), and the negative electrode lead 62 including nickel was welded to the negative electrode 42 (the negative electrode current collector 42A).

Thereafter, the positive electrode 41 and the negative electrode 42 were stacked on each other with the separator 43 (a polyethylene film having a thickness of 10 μm and a shutdown temperature of 130° C.) interposed therebetween, following which the stack of the positive electrode 41, the negative electrode 42, and the separator 43 was wound to thereby fabricate the wound body 40Z (having the outer diameter VD and the height VH) having the winding center space 40K (having an inner diameter of 1.5 mm).

Thereafter, the heat-resistant tape 50 (a polyimide adhesive tape having a thermal decomposition temperature of polyimide of higher than or equal to 500° C., and a thickness T) was adhered to a surface (the side surface 40X) of the wound body 40Z. In this case, the protruding part 50P (having the protrusion length N) of the heat-resistant tape 50 was made to protrude above the wound body 40Z.

Thereafter, a pressing process was performed on the protruding part 50P by means of a press working machine to thereby closely attach the protruding part 50P to a surface (the opposed surface 40Y) of the wound body 40Z. In this case, the protruding part 50P was closely attached to the opposed surface 40Y so as not to shield the winding center space 40K, to thereby set the area ratio S (%) to 41.1%. As a result, the heat-resistant tape 50 (the heat-resistant parts 50X and 50Y) was adhered to the wound body 40Z.

Thereafter, the wound body 40Z was placed into the container part 11 (including SUS316 and having a wall thickness of 0.15 mm) through the opening 11K. In this case, the wound body 40Z was disposed to be separated from the container part 11 (the sidewall part 11B) by the distance L1, and the negative electrode lead 62 was welded to the container part 11 (the lower bottom part 11A) by means of a resistance welding method.

Thereafter, the electrolytic solution was injected into the container part 11 through the opening 11K, following which the cover part 12 (including SUS316 and having a wall thickness of 0.15 mm, a depth of the recessed part 12H of 0.3 mm, an inner diameter of the recessed part 12H of 8 mm, and an inner diameter of the through hole 12K of 4 mm) was welded to the container part 11 by means of a laser welding method. The cover part 12 had the external terminal 20 (an aluminum/SUS304 plate having a thickness of 0.25 mm) attached thereto via the gasket 30 (including polypropylene and having a thickness of 0.05 mm). In this case, a portion of the electrolytic solution was supplied into the winding center space 40K. Further, the wound body 40Z was disposed to be separated from the cover part 12 by the distance L2, and the positive electrode lead 61 was welded to the external terminal 20 by means of a resistance welding method.

The wound body 40Z (including the positive electrode 41, the negative electrode 42, and the separator 43) was thus impregnated with the electrolytic solution. In this manner, the battery device 40 (having the outer diameter VD and the height VH) was fabricated, and the cover part 12 was joined to the container part 11 to thereby form the outer package can 10 (having the outer diameter (external diameter) D, the height (outer height) H, an inner diameter (internal diameter) ID, and a height (inner height) IH). As a result, the components including, without limitation, the battery device 40 and the heat-resistant tape 50 were sealed in the outer package can 10. The secondary battery was thus assembled.

In a case of assembling the secondary battery, the outer diameter D (mm), the height H (mm), the inner diameter ID (mm), and the height IH (mm) of the outer package can 10, the distances L1 and L2 (mm), the outer diameter VD (mm) and the height VH (mm) of the battery device 40, and the thickness T (mm) and the protrusion length N (mm) of the heat-resistant tape 50 were set, as indicated in Table 1.

(Stabilization of Secondary Battery)

The secondary battery after being assembled was charged and discharged for one cycle in an ambient temperature environment (at a temperature of 23° C.). Upon the charging, the secondary battery was charged with a constant current of 0.1 C until a voltage reached 4.2 V, and was thereafter charged with a constant voltage of 4.2 V until a current reached 0.05 C. Upon the discharging, the secondary battery was discharged with a constant current of 0.1 C until the voltage reached 3.0 V. Note that 0.1 C is a value of a current that causes the battery capacity (a theoretical capacity) to be completely discharged in 10 hours, and 0.05 C is a value of a current that causes the battery capacity to be completely discharged in 20 hours.

As a result, a film was formed on the surface of, for example, the negative electrode 42 to thereby electrochemically stabilize the state of the secondary battery. Thus, the secondary battery was completed.

[Fabrication of Secondary Batteries of Comparative Examples 1 to 5]

In order to make it easier to examine an influence of presence or absence of the heat-resistant tape 50 (the heat-resistant part 50Y) on thermal protection of the battery device 40, secondary batteries were fabricated in accordance with a similar procedure except that the heat-resistant tape 50 was not used.

The secondary batteries were evaluated for their performance (a battery capacity characteristic and manufacturing stability). The evaluation revealed the results presented in Tables 1 and 2.

(Battery Capacity Characteristic)

Instead of measuring a battery capacity, a space volume ($mm^3$), a device volume ($mm^3$), and a loss volume ($mm^3$) were each calculated, as a series of volume parameters that influence the battery capacity, on the basis of dimensions of respective parts of the secondary battery.

The space volume which is the volume of the internal space of the outer package can 10 was calculated on the basis of the inner diameter ID and the height IH of the outer package can 10. The space volume was calculated on the basis of the following calculation expression: space volume=(inner diameter ID/2)$^2$×π×height IH. Thereafter, the device volume which is a volume occupied by the battery device 40 was calculated on the basis of the outer diameter VD and the height VH of the battery device 40. The device volume was calculated on the basis of the following calculation expression: device volume=(outer diameter VD/2)$^2$×× height VH. Lastly, the loss volume was calculated on the basis of the space volume and the device volume. The loss volume was calculated on the basis of the following calculation expression: loss volume=space volume−device volume.

(Manufacturing Stability)

After the secondary battery was manufactured by performing the process of welding the cover part 12 to the container part 11 by means of the laser welding method, the secondary battery was disassembled to thereby collect the battery device 40. In this manner, it was visually checked whether the separator 43 was damaged in the vicinity of the outer edge part of the cover part 12. In the column of "damage" in each of Tables 1 and 2, "no" is written in a case where the separator 43 was not damaged, and "yes" is written in a case where the separator 43 burned out in part due to an influence of heating at the time of laser welding.

TABLE 1

| | Outer package can | | | | | | Battery device | | Heat-resistant tape | | | | | |
|---|---|---|---|---|---|---|---|---|---|---|---|---|---|---|
| | Outer diameter D (mm) | Height H (mm) | Inner diameter ID (mm) | Height IH (mm) | Distance L1 (mm) | Distance L2 (mm) | Outer diameter VD (mm) | Height VH (mm) | Thickness T (μm) | Protrusion length N (mm) | Space volume ($mm^3$) | Device volume ($mm^3$) | Loss volume ($mm^3$) | Damage |
| E1 | 9 | 5.5 | 8.7 | 4.9 | 0.1 | 0.1 | 8.4 | 4.75 | 50 | 1 | 291 | 263 | 28 | No |
| E2 | 9 | 5.5 | 8.7 | 4.9 | 0.5 | 0.5 | 7.6 | 4.35 | 50 | 1 | 291 | 197 | 94 | No |
| E3 | 9 | 5.5 | 8.7 | 4.9 | 0.1 | 0.1 | 8.4 | 4.77 | 30 | 1 | 291 | 267 | 24 | No |
| E4 | 9 | 5.5 | 8.7 | 4.9 | 0.5 | 0.5 | 7.6 | 4.37 | 30 | 1 | 291 | 200 | 91 | No |
| E5 | 9 | 5.5 | 8.7 | 4.9 | 1.0 | 1.0 | 6.6 | 3.87 | 30 | 1 | 291 | 134 | 157 | No |
| E6 | 9 | 5.5 | 8.7 | 4.9 | 0.1 | 0.1 | 8.5 | 4.79 | 10 | 1 | 291 | 271 | 21 | No |
| E7 | 12 | 5.5 | 11.7 | 4.9 | 0.1 | 0.1 | 11.4 | 4.75 | 50 | 1 | 527 | 485 | 42 | No |
| E8 | 12 | 5.5 | 11.7 | 4.9 | 0.5 | 0.5 | 10.6 | 4.35 | 50 | 1 | 527 | 384 | 143 | No |
| E9 | 12 | 5.5 | 11.7 | 4.9 | 0.1 | 0.1 | 11.4 | 4.77 | 30 | 1 | 527 | 490 | 37 | No |
| E10 | 12 | 5.5 | 11.7 | 4.9 | 0.5 | 0.5 | 10.6 | 4.37 | 30 | 1 | 527 | 389 | 138 | No |
| E11 | 12 | 5.5 | 11.7 | 4.9 | 1.0 | 1.0 | 9.6 | 3.87 | 30 | 1 | 527 | 282 | 244 | No |
| E12 | 12 | 5.5 | 11.7 | 4.9 | 0.1 | 0.1 | 11.5 | 4.79 | 10 | 1 | 527 | 496 | 31 | No |
| E13 | 16 | 5.5 | 15.7 | 4.9 | 0.1 | 0.1 | 15.4 | 4.75 | 50 | 1 | 949 | 885 | 66 | No |
| E14 | 16 | 5.5 | 15.7 | 4.9 | 0.5 | 0.5 | 14.6 | 4.35 | 50 | 1 | 949 | 728 | 220 | No |
| E15 | 16 | 5.5 | 15.7 | 4.9 | 0.1 | 0.1 | 15.4 | 4.77 | 30 | 1 | 949 | 893 | 55 | No |
| E16 | 16 | 5.5 | 15.7 | 4.9 | 0.5 | 0.5 | 14.6 | 4.37 | 30 | 1 | 949 | 736 | 213 | No |
| E17 | 16 | 5.5 | 15.7 | 4.9 | 1.0 | 1.0 | 13.6 | 3.87 | 30 | 1 | 949 | 565 | 383 | No |
| E18 | 16 | 5.5 | 15.7 | 4.9 | 0.1 | 0.1 | 15.5 | 4.79 | 10 | 1 | 949 | 902 | 47 | No |

TABLE 2

| | Outer package can | | | | | | Battery device | | Heat-resistant tape | | | | | |
|---|---|---|---|---|---|---|---|---|---|---|---|---|---|---|
| | Outer diameter D (mm) | Height H (mm) | Inner diameter ID (mm) | Height IH (mm) | Distance L1 (mm) | Distance L2 (mm) | Outer diameter VD (mm) | Height VH (mm) | Thickness T (μm) | Protrusion length N (mm) | Space volume ($mm^3$) | Device volume ($mm^3$) | Loss volume ($mm^3$) | Damage |
| C1 | 9 | 5.5 | 8.7 | 4.9 | 0.1 | 0.1 | 8.4 | 4.80 | — | — | 291 | 266 | 25 | Yes |
| C2 | 9 | 5.5 | 8.7 | 4.9 | 0.5 | 0.5 | 7.6 | 4.40 | — | — | 291 | 200 | 92 | Yes |
| C3 | 9 | 5.5 | 8.7 | 4.9 | 1.0 | 1.0 | 6.6 | 3.90 | — | — | 291 | 133 | 158 | No |
| C4 | 9 | 5.5 | 8.7 | 4.9 | 1.0 | 1.0 | 6.6 | 3.90 | — | — | 291 | 135 | 156 | No |
| C5 | 9 | 5.5 | 8.7 | 4.9 | 1.0 | 1.0 | 6.7 | 3.90 | — | — | 291 | 137 | 155 | No |

As indicated in Tables 1 and 2, the battery capacity characteristic and the manufacturing stability each varied depending on the presence or absence of the heat-resistant tape 50.

In a case where the heat-resistant tape 50 was not used (Comparative examples 1 to 5), a trade-off relationship was exhibited in which the separator 43 was damaged if the battery capacity increased, and the battery capacity decreased if the separator 43 was not damaged.

That is, in a case where the heat-resistant tape 50 was not used (Comparative examples 1 and 2), if each of the distances L1 and L2 was reduced, the device volume increased, i.e., the loss volume decreased, which resulted in an increase in battery capacity. However, the separator 43 was damaged, causing a short circuit in the battery device 40.

Further, in a case where the heat-resistant tape 50 was not used (Comparative examples 3 to 5), if each of the distances L1 and L2 was increased, the separator 43 was not damaged, causing no short circuit in the battery device 40. However, the device volume decreased, i.e., the loss volume increased, which resulted in a decrease in battery capacity.

In a case where the heat-resistant tape 50 was used (Examples 1 to 18), the trade-off relationship described above was overcome. That is, the separator 43 was not damaged, causing no short circuit in the battery device 40. Moreover, as a result of using the heat-resistant tape 50 (the heat-resistant part 50Y), no short circuit occurred even if each of the distances L1 and L2 was reduced. Accordingly, the device space volume increased, i.e., the loss volume decreased, which resulted in an increase in battery capacity.

In this case, in particular, if each of the distances L1 and L2 was less than or equal to 0.5 mm, or the thickness T of the heat-resistant tape 50 was less than or equal to 30 μm, the device volume further increased, i.e., the loss volume further decreased.

Examples 19 to 33

As indicated in Table 3, secondary batteries were fabricated in accordance with a similar procedure except that the protrusion length N of the heat-resistant tape 50 was changed to thereby vary the area ratio S (%) in response to variation in the areas S1 and S2 (mm$^2$), and thereafter the secondary batteries were evaluated for their performance. Here, other manufacturing stability was evaluated as the performance of the secondary batteries.

In a case of examining the other manufacturing stability, in the process of manufacturing the secondary battery (the process of injecting the electrolytic solution into the container part 11), it was visually checked whether the electrolytic solution overflowed the container part 11 as a result of not fitting into the container part 11. In the column of "liquid overflow" in Table 3, "no" is written in a case where a portion of the electrolytic solution was sufficiently supplied into the winding center space 40K and the electrolytic solution thus did not overflow the container part 11, and "yes" is written in a case where a portion of the electrolytic solution was not sufficiently supplied into the winding center space 40K and the electrolytic solution thus overflowed the container part 11.

TABLE 3

Distance L1 = 0.1 mm, Distance L2 = 0.1 mm, Thickness T = 10 μm

| | Outer package can | | | | Battery device | | Heat-resistant tape | | | | |
|---|---|---|---|---|---|---|---|---|---|---|---|
| | Outer diameter D (mm) | Height H (mm) | Inner diameter ID (mm) | Height IH (mm) | Outer diameter VD (mm) | Height VH (mm) | Area S1 (mm$^2$) | Protrusion length N (mm) | Area S2 (mm$^2$) | Area ratio S (%) | Liquid overflow |
| E19 | 9 | 5.5 | 8.7 | 4.9 | 8.5 | 4.79 | 58 | 0.5 | 13 | 21.9 | No |
| E6 | 9 | 5.5 | 8.7 | 4.9 | 8.5 | 4.79 | 58 | 1.0 | 24 | 41.1 | No |
| E20 | 9 | 5.5 | 8.7 | 4.9 | 8.5 | 4.79 | 58 | 1.5 | 33 | 57.7 | No |
| E21 | 9 | 5.5 | 8.7 | 4.9 | 8.5 | 4.79 | 58 | 2.0 | 41 | 71.4 | No |
| E22 | 9 | 5.5 | 8.7 | 4.9 | 8.5 | 4.79 | 58 | 2.5 | 48 | 82.5 | Yes |
| E23 | 9 | 5.5 | 8.7 | 4.9 | 8.5 | 4.79 | 58 | 3.0 | 53 | 90.9 | Yes |
| E24 | 12 | 5.5 | 11.7 | 4.9 | 11.5 | 4.79 | 106 | 0.5 | 17 | 16.5 | No |
| E12 | 12 | 5.5 | 11.7 | 4.9 | 11.5 | 4.79 | 106 | 1.0 | 33 | 31.5 | No |
| E25 | 12 | 5.5 | 11.7 | 4.9 | 11.5 | 4.79 | 106 | 2.0 | 60 | 57.1 | No |
| E26 | 12 | 5.5 | 11.7 | 4.9 | 11.5 | 4.79 | 106 | 3.0 | 81 | 76.7 | No |
| E27 | 12 | 5.5 | 11.7 | 4.9 | 11.5 | 4.79 | 106 | 4.0 | 95 | 90.4 | Yes |
| E28 | 12 | 5.5 | 11.7 | 4.9 | 11.5 | 4.79 | 106 | 5.0 | 104 | 98.1 | Yes |
| E29 | 16 | 5.5 | 15.7 | 4.9 | 15.5 | 4.79 | 191 | 0.5 | 24 | 12.4 | No |
| E18 | 16 | 5.5 | 15.7 | 4.9 | 15.5 | 4.79 | 191 | 1.0 | 46 | 24.0 | No |
| E30 | 16 | 5.5 | 15.7 | 4.9 | 15.5 | 4.79 | 191 | 2.0 | 85 | 44.7 | No |
| E31 | 16 | 5.5 | 15.7 | 4.9 | 15.5 | 4.79 | 191 | 3.0 | 119 | 62.2 | No |
| E32 | 16 | 5.5 | 15.7 | 4.9 | 15.5 | 4.79 | 191 | 4.0 | 146 | 76.3 | No |
| E33 | 16 | 5.5 | 15.7 | 4.9 | 15.5 | 4.79 | 191 | 5.0 | 166 | 87.1 | Yes |

As indicated in Table 3, in a case where the area ratio S was less than or equal to 80% (e.g., Examples 6 and 19 to 21), the winding center space 40K was not shielded too much by the heat-resistant tape 50, as compared with a case where the area ratio S was greater than 80% (e.g., Examples 22 and 23). As a result, the electrolytic solution did not overflow the container part 11.

The results presented in Tables 1 to 3 indicate that, in a case where the battery device 40 (the opposed surface 40Y and the side surface 40X) was contained inside the outer package can 10 (the container part 11 and the cover part 12), where the cover part 12 was welded to the container part 11, where the heat-resistant tape 50 was disposed between the outer package can 10 and the battery device 40, and where the heat-resistant tape 50 covered from the opposed surface 40Y to the side surface 40X, the battery capacity characteristic was secured and the manufacturing stability was improved. This made it possible to suppress occurrence of a short circuit while securing a battery capacity.

Although the present technology has been described herein with reference to one or more embodiments including Examples, the configuration of the present technology is not limited thereto those, and is therefore modifiable in a variety of suitable ways.

For example, although the description has been given of the case where the electrode reactant is lithium, the electrode reactant is not particularly limited. Accordingly, the electrode reactant may be another alkali metal such as sodium or potassium, or may be an alkaline earth metal such as beryllium, magnesium, or calcium, as described above. In addition, the electrode reactant may be another light metal such as aluminum.

The effects described herein are mere examples, and effects of the present technology are therefore not limited thereto. Accordingly, the present technology may achieve any other suitable effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
an outer package member;
a battery device contained inside the outer package member, and
a heat-resistant member having an insulating property and disposed between the outer package member and the battery device, wherein
the outer package member includes
a container member having an opening, the container member containing the battery device inside, and
a closing member closing the opening, the closing member being welded to the container member,
the battery device includes a positive electrode and a negative electrode that are opposed to each other and are wound around a winding axis, and has a winding center space at a center around which the positive electrode and the negative electrode are each wound,
the battery device has
an opposed surface opposed to the closing member and perpendicular to the winding axis, and
a side surface coupled to the opposed surface,
the heat-resistant member covers from the opposed surface to the side surface, and
the heat-resistant member covers around an entire circumference of the boundary between the opposed surface and the side surface;
wherein when viewed from the winding axis, the heat-resistant member does not overlap with the winding center space.

2. The secondary battery according to claim 1, wherein
the battery device includes a positive electrode and a negative electrode opposed to each other with a separator interposed therebetween, and
the heat-resistant member has a melting point higher than a shutdown temperature of the separator.

3. The secondary battery according to claim 1, wherein the heat-resistant member includes polyimide.

4. The secondary battery according to claim 1, wherein the heat-resistant member is adhered to both the opposed surface and the side surface.

5. The secondary battery according to claim 1, wherein
the container member includes a sidewall part opposed to the side surface,
a distance from the closing member to the opposed surface is less than or equal to 0.5 millimeters, and
a distance from the sidewall part to the side surface is less than or equal to 0.5 millimeters.

6. The secondary battery according to claim 1, wherein the heat-resistant member has a thickness of less than or equal to 30 micrometers.

7. A secondary battery comprising:
an outer package member;
a battery device contained inside the outer package member, and
a heat-resistant member having an insulating property and disposed between the outer package member and the battery device, wherein
the outer package member includes
a container member having an opening, the container member containing the battery device inside, and
a closing member closing the opening, the closing member being welded to the container member,
the battery device includes a positive electrode and a negative electrode that are opposed to each other and are wound around a winding axis, and has a winding center space at a center around which the positive electrode and the negative electrode are each wound,
the battery device has
an opposed surface opposed to the closing member and perpendicular to the winding axis, and
a side surface coupled to the opposed surface,
the heat-resistant member covers from the opposed surface to the side surface, and
the heat-resistant member covers around an entire circumference of the boundary between the opposed surface and the side surface, wherein
the heat resistant member so covers the opposed surface as not to shield the winding center space.

8. The secondary battery according to claim 7, wherein a ratio of an area of the opposed surface covered by the heat-resistant member to an area of the opposed surface is less than or equal to 80 percent.

9. The secondary battery according to claim 1, wherein the secondary battery has a flat and columnar shape.

10. The secondary battery according to claim 1, wherein the secondary battery comprises a lithium-ion secondary battery.

11. A secondary battery comprising:
an outer package member;
a battery device contained inside the outer package member, and
a heat-resistant member having an insulating property and disposed between the outer package member and the battery device, wherein
the outer package member includes
a container member having an opening, the container member containing the battery device inside, and
a closing member closing the opening, the closing member being welded to the container member,
the battery device includes a positive electrode and a negative electrode that are opposed to each other and are wound around a winding axis, and has a winding center space at a center around which the positive electrode and the negative electrode are each wound, the battery device has
an opposed surface opposed to the closing member and perpendicular to the winding axis, and
a side surface coupled to the opposed surface,
the heat-resistant member covers from the opposed surface to the side surface, and
the heat-resistant member covers around an entire circumference of the boundary between the opposed surface and the side surface, wherein the closing member has a recessed part that is protruded in part toward an inside of the outer package member, and
when viewed from the winding axis, the heat-resistant member does not overlap with the recessed part.

* * * * *